US011351912B2

(12) United States Patent
Ishida

(10) Patent No.: US 11,351,912 B2
(45) Date of Patent: Jun. 7, 2022

(54) VEHICLE HEADLAMP SYSTEM AND VEHICLE LAMP SYSTEM

(71) Applicant: KOITO MANUFACTURING CO., LTD., Tokyo (JP)

(72) Inventor: Hiroyuki Ishida, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/759,165

(22) PCT Filed: Oct. 25, 2018

(86) PCT No.: PCT/JP2018/039727
§ 371 (c)(1),
(2) Date: Apr. 24, 2020

(87) PCT Pub. No.: WO2019/082980
PCT Pub. Date: May 2, 2019

(65) Prior Publication Data
US 2021/0178959 A1    Jun. 17, 2021

(30) Foreign Application Priority Data

Oct. 26, 2017  (JP) .............. JP2017-207465
Oct. 26, 2017  (JP) .............. JP2017-207466
Oct. 26, 2017  (JP) .............. JP2017-207467

(51) Int. Cl.
*B60Q 1/08*     (2006.01)
*B60W 50/14*    (2020.01)

(52) U.S. Cl.
CPC .......... *B60Q 1/085* (2013.01); *B60W 50/14* (2013.01); *B60Q 2300/21* (2013.01); *B60Q 2300/45* (2013.01)

(58) Field of Classification Search
CPC .......... B60Q 1/48; B60Q 1/085; B60Q 1/143; B60Q 1/326; B60Q 1/442; B60Q 1/501; B60Q 1/1423; B60Q 1/2696
See application file for complete search history.

(56) References Cited

U.S. PATENT DOCUMENTS

2008/0027641 A1\* 1/2008 Fujiwara ............ G01C 21/3667
                                                   701/457
2015/0239392 A1\* 8/2015 Mizuno ................. B60Q 1/143
                                                   362/466

(Continued)

FOREIGN PATENT DOCUMENTS

DE   102015200859 A1   7/2016
JP   H09277887 A       10/1997
(Continued)

OTHER PUBLICATIONS

International Search Report with English Translation issued in corresponding International Application No. PCT/JP2018/039727, dated Jan. 15, 2019 (6 pages).

(Continued)

*Primary Examiner* — Tung X Le
(74) *Attorney, Agent, or Firm* — Osha Bergman Watanabe & Burton LLP

(57) ABSTRACT

A vehicle headlight system that can be used together with a vehicle control unit (3) that switches from an autonomous driving mode to a manual driving mode on the basis of external information about a vehicle (1), wherein the system has a headlight (100) mounted on the vehicle (1), and a lamp control unit (4) that controls the headlight (100), the lamp control unit (4): controlling the headlight (100) so as to form a first light distribution pattern (P) when the vehicle control unit (3) is executing the autonomous driving mode; controlling the headlight (100) so as to form a second light distribution pattern (Q) when the vehicle control unit (3) is (Continued)

executing the manual driving mode; and controlling the headlight so as to form a third light distribution pattern (R) that irradiates at an illuminance equal to or greater than the illuminance of the first light distribution pattern (P) and/or irradiates a range equal to or greater than the irradiation region of the first light distribution pattern (P), when transitioning from the autonomous driving mode to the manual driving mode.

9 Claims, 26 Drawing Sheets

(56) References Cited

U.S. PATENT DOCUMENTS

| | | | |
|---|---|---|---|
| 2016/0280236 A1 | 9/2016 | Otsuka | |
| 2017/0023945 A1* | 1/2017 | Cavalcanti | G08G 1/0141 |
| 2018/0043819 A1* | 2/2018 | Kim | B60Q 1/24 |
| 2018/0056851 A1* | 3/2018 | Kim | G05D 1/0061 |
| 2018/0079352 A1* | 3/2018 | Dalal | B60Q 1/0076 |
| 2018/0222492 A1 | 8/2018 | Takii et al. | |
| 2018/0281788 A1 | 10/2018 | Uchida | |
| 2018/0362053 A1* | 12/2018 | Isa | G02B 27/0093 |
| 2019/0033860 A1 | 1/2019 | Okimoto et al. | |

FOREIGN PATENT DOCUMENTS

| | | |
|---|---|---|
| JP | 2006044359 A | 2/2006 |
| JP | 2016175613 A | 10/2016 |
| KR | 20170081375 A | 7/2017 |
| WO | 2017060978 A1 | 4/2017 |
| WO | 2017073636 A1 | 5/2017 |
| WO | 2017158771 A1 | 9/2017 |

OTHER PUBLICATIONS

Written Opinion of the International Searching Authority issued in corresponding International Application No. PCT/JP2018/039727, dated Jan. 15, 2019 (5 pages).

Extended European Search Report issued in corresponding Application No. 18871342.4 dated Jul. 7, 2021 (8 pages).

* cited by examiner

VEHICLE HEADLAMP SYSTEM AND VEHICLE LAMP SYSTEM

TECHNICAL FIELD

The present invention relates to a vehicle headlamp system and a vehicle lamp system.

BACKGROUND ART

Recently, study on automatic driving technology of automobiles has been actively conducted in countries, and legislation for enabling a vehicle to travel on a public road in an automatic driving mode has been considered in countries. Here, the automatic driving mode refers to a mode in which traveling of a vehicle is automatically controlled. On the other hand, a manual driving mode refers to a mode in which the traveling of the vehicle is controlled by a driver. In an autonomous driving vehicle, the traveling of the vehicle is automatically controlled by a computer.

CITATION LIST

Patent Literature

Patent Literature 1: JP-A-H9-277887

SUMMARY OF INVENTION

Technical Problem

However, in a vehicle capable of executing both the manual driving mode and the automatic driving mode, a vehicle control unit may switch to the manual driving mode due to some reason during execution of the automatic driving mode. At this time, a user of the vehicle who is to drive manually should well grasp a surrounding situation when the manual driving is started.

Therefore, an object of the present invention is to provide a vehicle headlamp system or a vehicle lamp system in which a user can easily grasp a surrounding situation when switching from automatic driving to manual driving.

Solution to Problem

In order to achieve the above object, one aspect of the present invention provides A vehicle headlamp system that is used with a vehicle control unit configured to switch from an automatic driving mode to a manual driving mode based on external information of a vehicle, the vehicle headlamp system comprising:
  a headlamp mounted on a vehicle; and
  a lamp control unit configured to control the headlamp,
  wherein the lamp control unit is configured to
    control the headlamp to form a first light distribution pattern while the vehicle control unit is executing the automatic driving mode,
    control the headlamp to form a second light distribution pattern while the vehicle control unit is executing the manual driving mode, and
    control the headlamp to form a third light distribution pattern that illuminates at an illuminance equal to or higher than an illuminance of the first light distribution pattern and/or illuminates an area equal to or larger than an illumination area of the first light distribution pattern when transitioning from the automatic driving mode to the manual driving mode.

Another aspect of the present invention provides a vehicle lamp system that is used with a vehicle control unit configured to switch from an automatic driving mode to a manual driving mode based on external information of a vehicle, the vehicle lamp system including:
  a lamp mounted on a vehicle; and
  a lamp control unit configured to control the lamp,
  wherein the lamp control unit emits light so as to point to an object that causes the vehicle control unit to switch from the automatic driving mode to the manual driving mode.

Another aspect of the present invention provides a vehicle lamp system that is used with a vehicle control unit configured to switch from an automatic driving mode to a manual driving mode based on external information of a vehicle, the vehicle lamp system including:
  a lamp mounted on a vehicle; and
  a lamp control unit configured to control the lamp,
  wherein the lamp control unit illuminates a recommended route of the vehicle proposed by the vehicle control unit with the lamp before the vehicle control unit switches from the automatic driving mode to the manual driving mode.

Advantageous Effects of Invention

According to the present invention, it is possible to provide the vehicle headlamp system in which a user can easily grasp a surrounding situation when switching from automatic driving to manual driving.

DESCRIPTION OF EMBODIMENTS

Hereinafter, an embodiment of the present invention (hereafter, referred to as "the present embodiment") will be described with reference to the drawings. Incidentally, members having the same reference numbers as members that have been described in the description of the present embodiment will be omitted for convenience of description.

In the description of the present embodiment, "left-right direction", "front-rear direction", and "upper-lower direction" will be appropriately referred to, for convenience of description. These directions are relative directions set for a vehicle 1 shown in FIGS. 1A and 1B. Here, the "upper-lower direction" is a direction including an "upper direction" and a "lower direction". The "front-rear direction" is a direction including a "front direction" and a "rear direction". The "left-right direction" is a direction including a "left direction" and a "right direction".

Figure 1A:
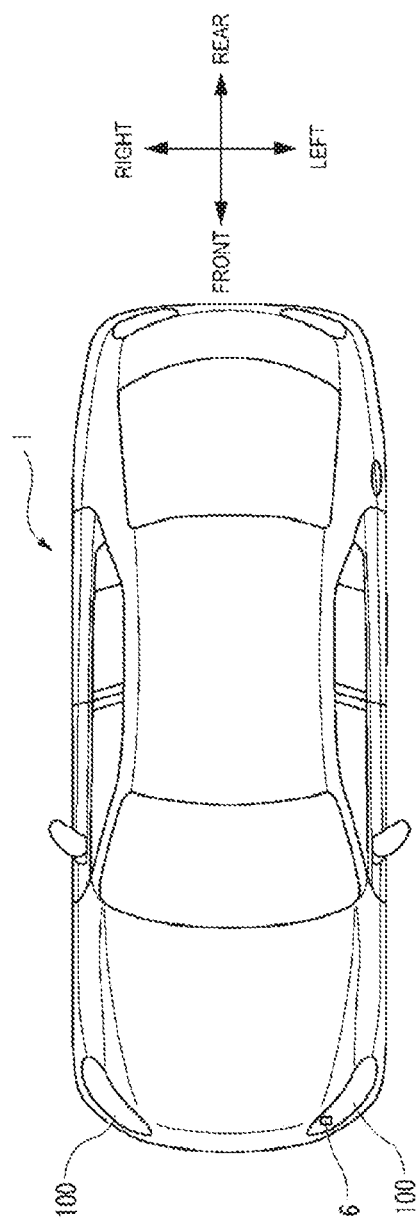
FIG. 1A is a top view of a vehicle including a vehicle headlamp system according to an embodiment of the present invention.
Figure 1B:
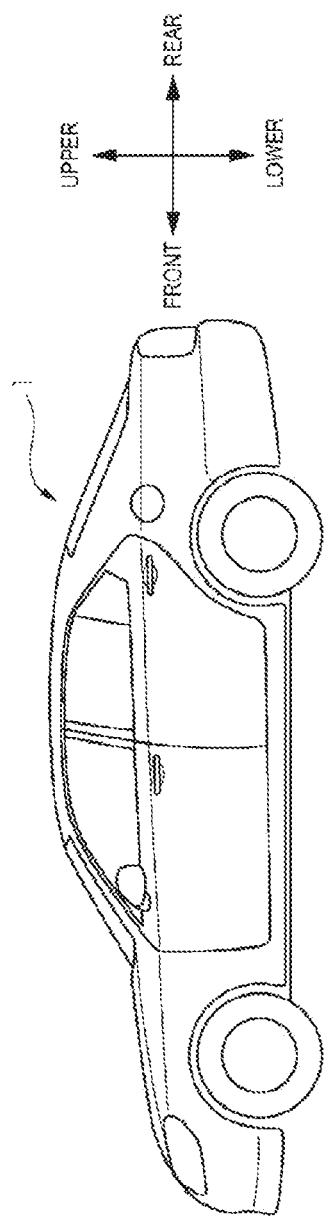
FIG. 1B is a side view of the vehicle including the vehicle headlamp system according to the embodiment of the present invention.

FIGS. 1A and 1B show the vehicle 1 on which a vehicle headlamp system according to the present embodiment is mounted. FIG. 1A shows a top view of the vehicle 1, and FIG. 1B shows a side view of the vehicle 1. The vehicle 1 is an automobile that can travel in an automatic driving mode. The vehicle 1 is equipped with headlamps (HL) 100 at left and right front portions.

Figure 2:
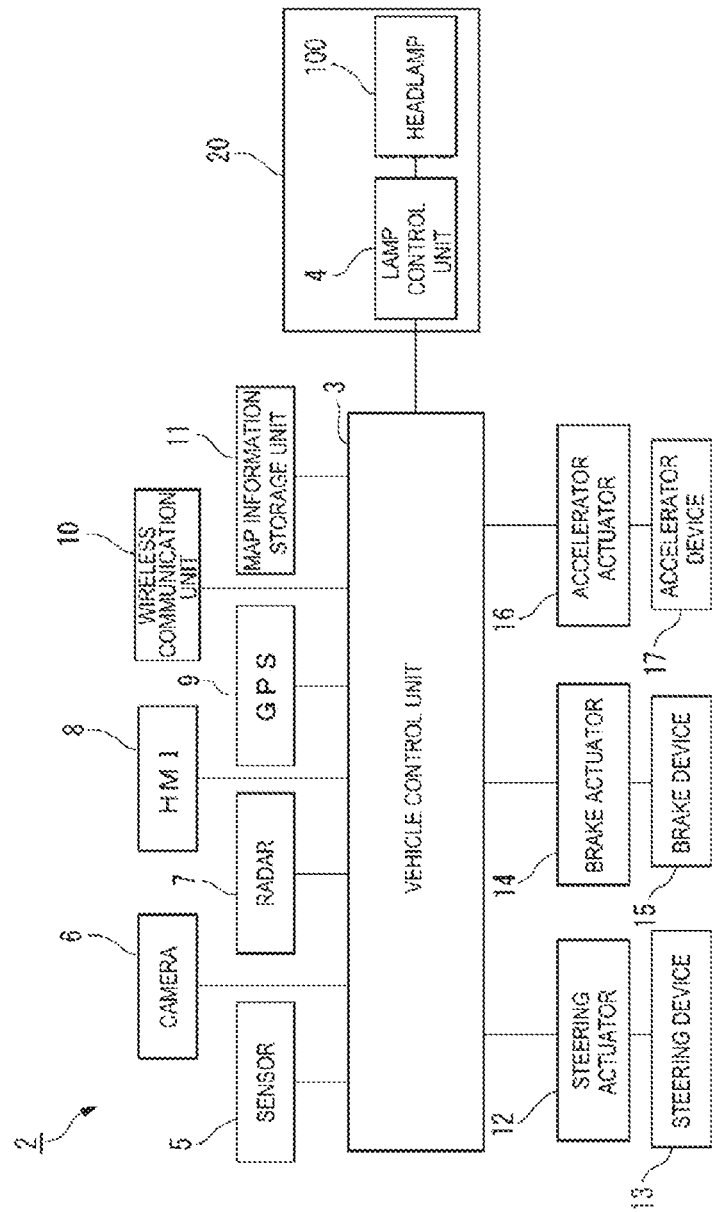
FIG. 2 is a block diagram of a vehicle system and the vehicle headlamp system.

FIG. 2 is a block diagram of a vehicle system 2 and a vehicle headlamp system 20 mounted on the vehicle 1. First, the vehicle system 2 will be described with reference to FIG. 2. As shown in FIG. 2, the vehicle system 2 includes a vehicle control unit 3, a sensor 5, a camera 6, a radar 7, a human machine interface (HMI) 8, a global positioning system (GPS) 9, a wireless communication unit 10, and a map information storage unit 11. The vehicle system 2 further includes a steering actuator 12, a steering device 13, a brake actuator 14, a brake device 15, an accelerator actuator 16, and an accelerator device 17.

The vehicle control unit 3 is configured by an electronic control unit (ECU). The ECU includes a processor such as a central processing unit (CPU), a read only memory (ROM) in which various vehicle control programs are stored, and a random access memory (RAM) in which various vehicle control data is temporarily stored. The processor is configured to load a program designated by various vehicle control programs stored in the ROM on the RAM and execute various processes in cooperation with the RAM. The vehicle control unit 3 is configured to control the traveling of the vehicle 1 based on external information of the vehicle 1.

The sensor 5 includes an acceleration sensor, a speed sensor, a gyro sensor, or the like. The sensor 5 is configured to detect a traveling state of the vehicle 1 and output traveling state information to the vehicle control unit 3. The sensor 5 may also include a seating sensor that detects whether or not a driver is seated in a driver's seat, a face orientation sensor that detects a direction of a face of the driver, an external weather sensor that detects an external weather condition, a human sensor that detects whether or not there is a person in the vehicle, or the like. Further, the sensor 5 may include an illuminance sensor that detects an illuminance of a surrounding environment of the vehicle 1.

For example, the camera 6 is a camera includes an image capturing element such as a charge-coupled device (CCD) or a complementary MOS (CMOS). The camera 6 is a camera that detects visible light or an infrared camera that detects an infrared ray. The radar 7 is a millimeter-wave radar, a microwave radar, a laser radar, or the like. The camera 6 and the radar 7 are configured to detect the surrounding environment (other vehicles, a pedestrian, a road shape, a traffic signs, an obstacle, or the like) of the vehicle 1 and output surrounding environment information to the vehicle control unit 3.

The HMI 8 includes an input unit that receives an input operation from the driver, and an output unit that outputs traveling information or the like to the driver. The input unit includes a steering wheel, an accelerator pedal, a brake pedal, a driving mode switching switch that switches a driving mode of the vehicle 1, or the like. The output unit is a display that displays various traveling information.

The GPS 9 is configured to acquire the current position information of the vehicle 1 and output the acquired current position information to the vehicle control unit 3. The wireless communication unit 10 is configured to receive traveling information of another vehicle around the vehicle 1 from the other vehicle and transmit the traveling information of the vehicle 1 to the other vehicle (inter-vehicle communication). In addition, the wireless communication unit 10 is configured to receive infrastructure information from infrastructure equipment such as a traffic light or a sign lamp and transmit the traveling information of the vehicle 1 to the infrastructure equipment (road-to-vehicle communication). The map information storage unit 11 is an external storage device such as a hard disk drive in which map information is stored, and is configured to output the map information to the vehicle control unit 3.

In a case where the vehicle 1 travels in a fully automatic driving mode or an advanced driving assistance mode, the vehicle control unit 3 automatically generates at least one of a steering control signal, an accelerator control signal, and a brake control signal based on the external information such as the traveling state information, the surrounding environment information, the current position information, and the map information. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal.

Thus, in these modes, the traveling of the vehicle 1 is automatically controlled by the vehicle system 2.

In a case where the vehicle 1 travels in a driving assistance mode or a fully manual driving mode, the vehicle control unit 3 generates a steering control signal, an accelerator control signal, and a brake control signal according to a manual operation of the driver with respect to the accelerator pedal, the brake pedal, and the steering wheel. As described above, in these modes, since the steering control signal, the accelerator control signal, and the brake control signal are generated by the manual operation of the driver, the traveling of the vehicle 1 is controlled by the driver.

Next, the driving mode of the vehicle 1 will be described. The driving mode includes the fully automatic driving mode, the advanced driving assistance mode, the driving assistance mode, and the fully manual driving mode. In the fully automatic driving mode, the vehicle system 2 automatically performs all of traveling controls of a steering control, a brake control, and an accelerator control, and the driver is not in a state in which the vehicle 1 can be driven. In the advanced driving assistance mode, the vehicle system 2 automatically performs all of the traveling controls of the steering control, the brake control, and the accelerator control, and the driver does not drive the vehicle 1 although the vehicle 1 can be driven. In the driving assistance mode, the vehicle system 2 automatically performs a part of the traveling controls of the steering control, the brake control, and the accelerator control, and the driver drives the vehicle 1 under the driving assistance of the vehicle system 2. On the other hand, in the fully manual driving mode, the vehicle system 2 does not automatically perform the traveling control, and the driver drives the vehicle 1 without the driving assistance of the vehicle system 2.

The driving mode of the vehicle 1 may be switched by operating the driving mode switching switch. In this case, the vehicle control unit 3 switches the driving mode of the vehicle 1 between four driving modes (the fully automatic driving mode, the advanced driving assistance mode, the driving assistance mode, and the fully manual driving mode) according to an operation of the driver with respect to the driving mode switching switch. In addition, the driving mode of the vehicle 1 may be automatically switched based on information on a travelable section in which an autonomous driving vehicle can travel or a travel-prohibited section in which the traveling of the autonomous driving vehicle is prohibited, or information on the external weather condition. In this case, the vehicle control unit 3 switches the driving mode of the vehicle 1 based on the external information. Further, the driving mode of the vehicle 1 may be automatically switched by using the seating sensor, the face orientation sensor, or the like. In this case, the vehicle control unit 3 switches the driving mode of the vehicle 1 based on the output signal from the seating sensor or the face orientation sensor.

Next, the vehicle headlamp system 20 of the vehicle 1 will be described with reference to FIG. 2. As shown in FIG. 2, the vehicle headlamp system 20 includes the headlamp 100 and a lamp control unit 4 that controls the headlamp 100.

The lamp control unit 4 is connected to the vehicle control unit 3, and is configured to control an operation of the headlamp 100 based on a signal transmitted from the vehicle control unit 3. For example, the lamp control unit 4 can control the headlamp 100 based on the signal transmitted from the vehicle control unit 3 and emit light in a predetermined light distribution pattern.

Figure 3:
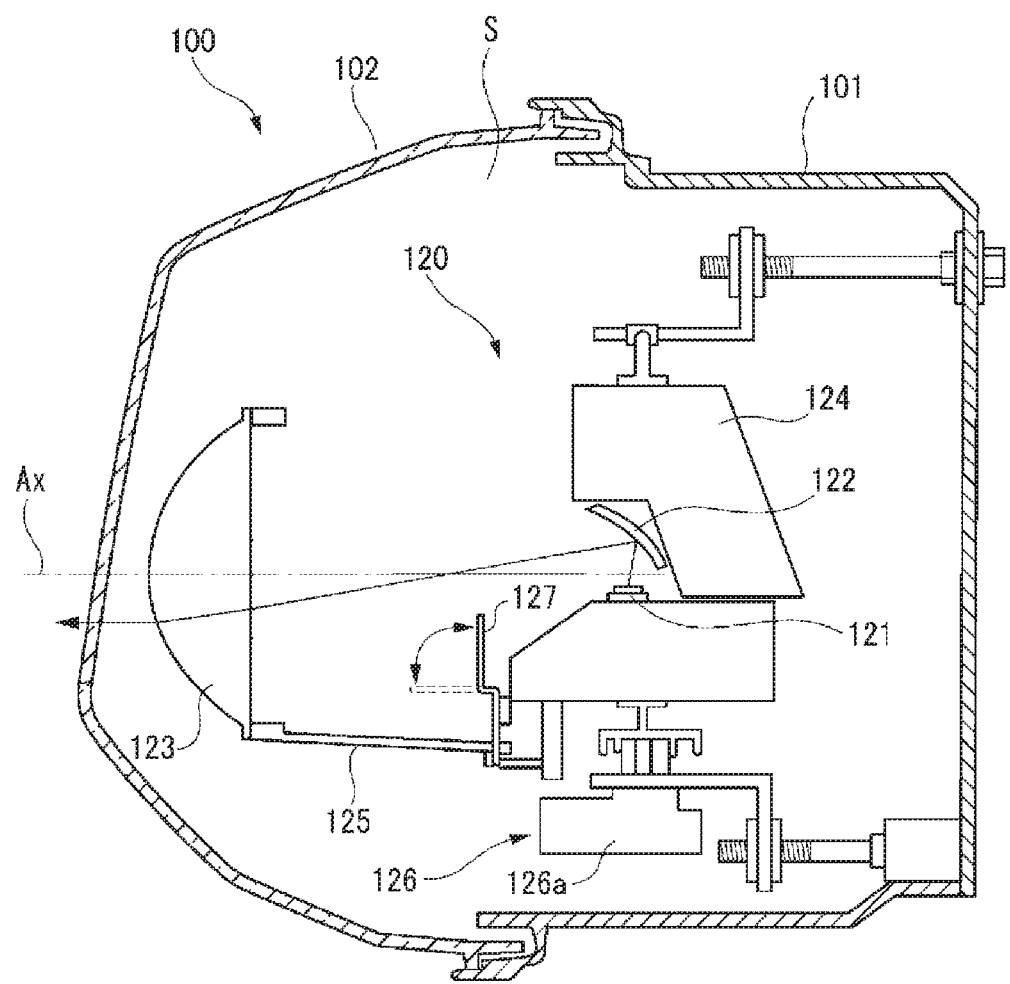
FIG. 3 is a vertical sectional view of a headlamp.

FIG. 3 is a vertical sectional view showing a schematic configuration of the headlamp 100. As shown in FIG. 3, the headlamp 100 includes a housing 101 having an opening in front thereof, and an outer cover 102 that closes the opening to form a lamp chamber S together with the housing 101. A light source unit 120 that emits light in an optical axis Ax direction extending in a front-rear direction of the lamp is provided inside the lamp chamber S. The light source unit 120 includes a light source 121 such as an LED, a reflector 122 that reflects light emitted from the light source 121 toward the front of the lamp, and a projection lens 123 provided in front of the reflector 122.

The projection lens 123 emits the light emitted from the light source 121 and reflected by the reflector 122 to the front of the lamp. The headlamp 100 arranged on a right front portion of the vehicle forms a right light distribution pattern PR in front of the lamp. The headlamp 100 arranged on a left front portion of the vehicle forms a left light distribution pattern PL in front of the lamp.

The light source 121 and the reflector 122 are mounted on a base portion 124. The projection lens 123 is fixed to a lens holder 125 fixed to the base portion 124. The base portion 124 is displaceably supported by the housing 101 via a swivel mechanism 126. The swivel mechanism 126 includes a motor 126a. The swivel mechanism 126 is connected to the lamp control unit 4. The lamp control unit 4 drives the swivel mechanism 126 according to a signal transmitted from the vehicle control unit 3. The swivel mechanism 126 turns an optical axis Ax of the light source unit 120 in a left-right direction. As a result, the right light distribution pattern PR and the left light distribution pattern PL formed by the headlamp 100 can be displaced in a horizontal direction.

A shade 127 that can shade a part of the light emitted from the light source 121 is provided between the reflector 122 and the projection lens 123. The shade 127 is fixed to the lens holder 125. The shade 127 is movable between a position (a position indicated by a solid line in FIG. 3) at which a part of light incident on the projection lens 123 is blocked and a position (a position indicated by a broken line in FIG. 3) at which the light incident on the projection lens 123 is not blocked by a shade driving mechanism (not shown).

The headlamp 100 can form at least a first light distribution pattern P (see FIG. 5), second light distribution pattern Q (see FIG. 6) and a third light distribution pattern R (see FIG. 7), which will be described later. The first light distribution pattern P is a light distribution pattern suitable for the automatic driving mode. The second light distribution pattern Q is a light distribution pattern suitable for the manual driving mode. The third light distribution pattern R is a light distribution pattern suitable for transition from the automatic driving mode to the manual driving mode. For example, the second light distribution pattern Q may be a so-called low beam light distribution pattern. In addition, the third light distribution pattern R may be a so-called high beam light distribution pattern.

When the shade 127 is moved to the position at which a part of the light incident on the projection lens 123 is blocked, the headlamp 100 illuminates the front of the headlamp 100 with the second light distribution pattern Q. When the shade 127 is moved to the position at which a part of the light incident on the projection lens 123 is not blocked, the headlamp 100 illuminates the front of the headlamp 100 with the third light distribution pattern R. The shade 127 can form a cut-off line CL (see FIG. 6) of the second light distribution pattern Q.

Figure 4:
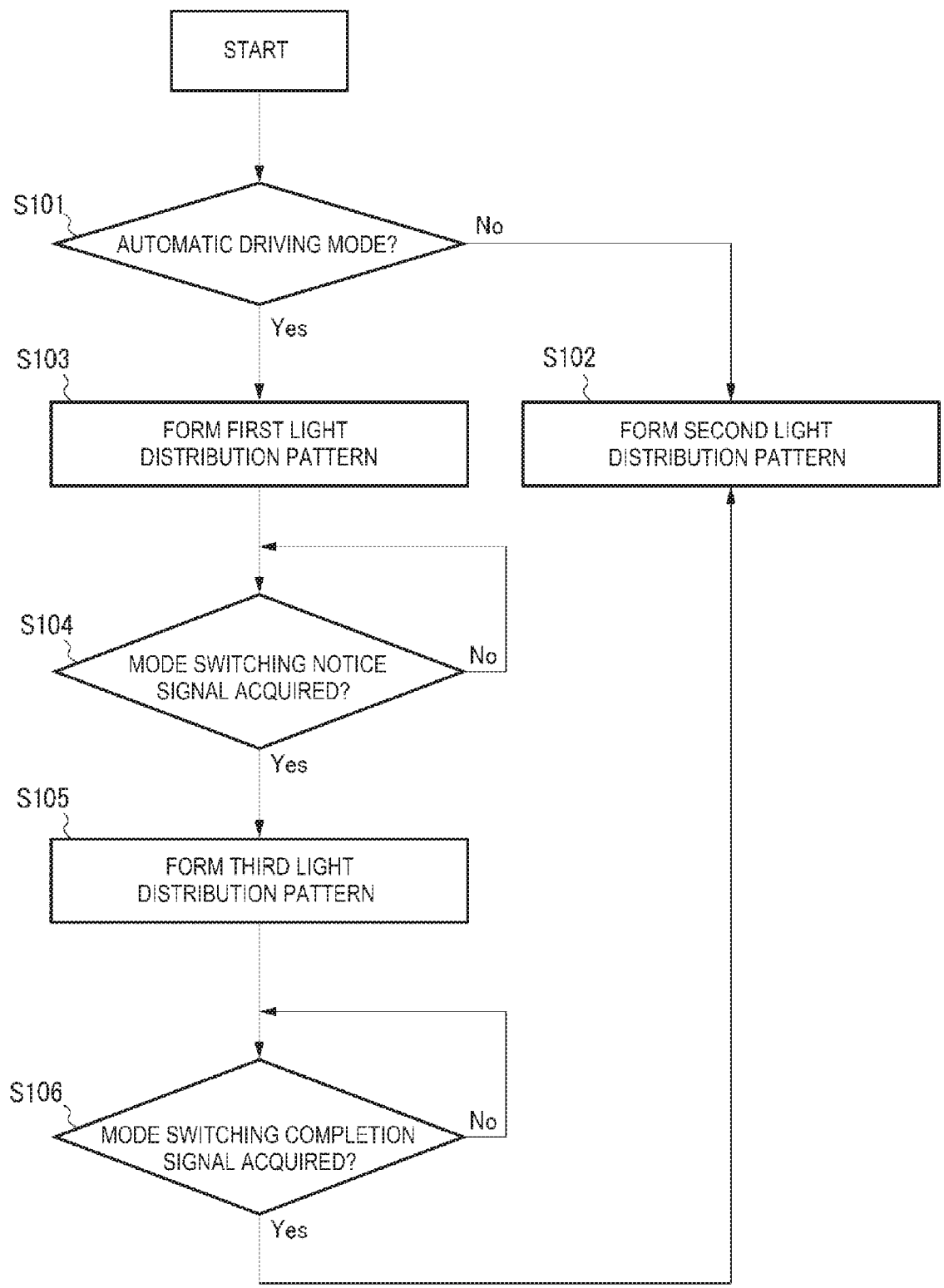
FIG. 4 is a flow chart illustrating an operation of the vehicle headlamp system.
Figure 5:
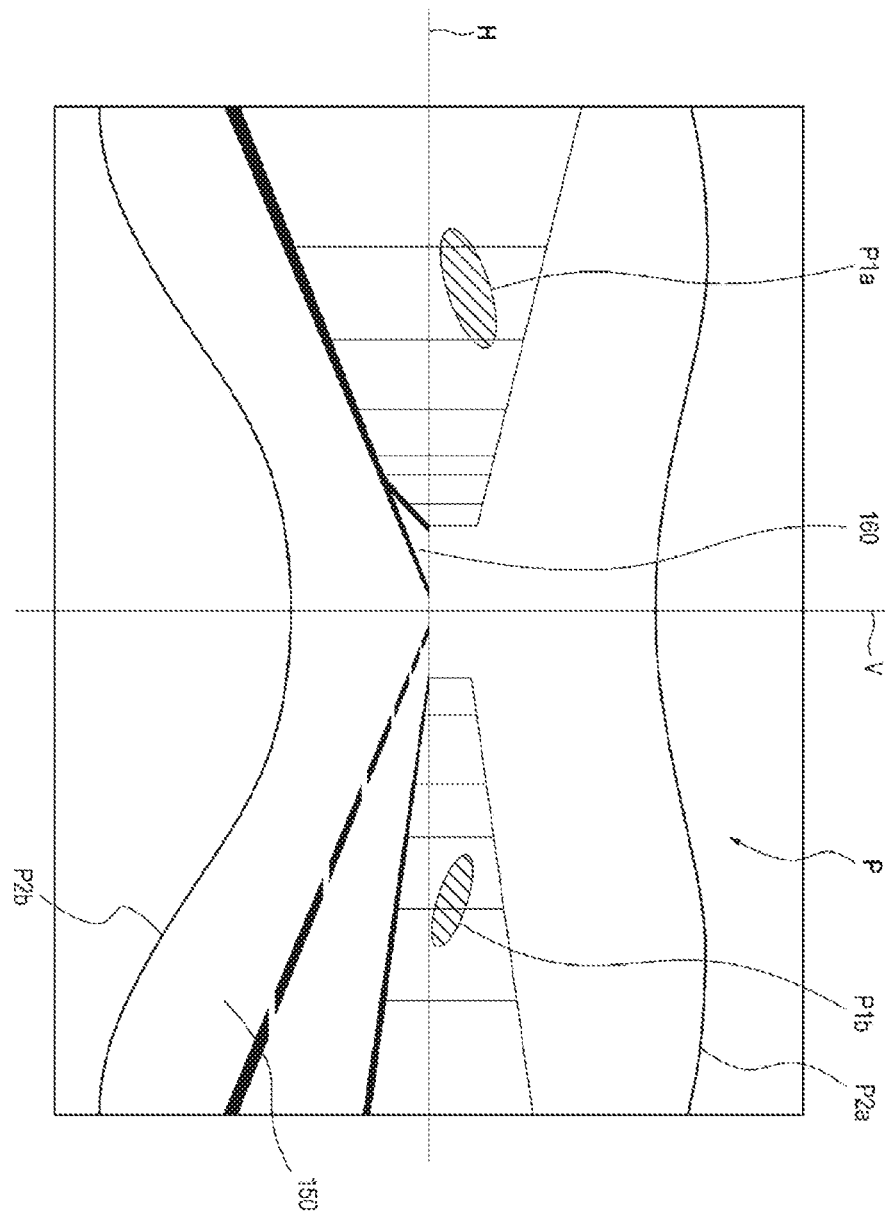
FIG. 5 is a diagram showing a first light distribution pattern formed when an automatic driving mode is executed.
Figure 6:
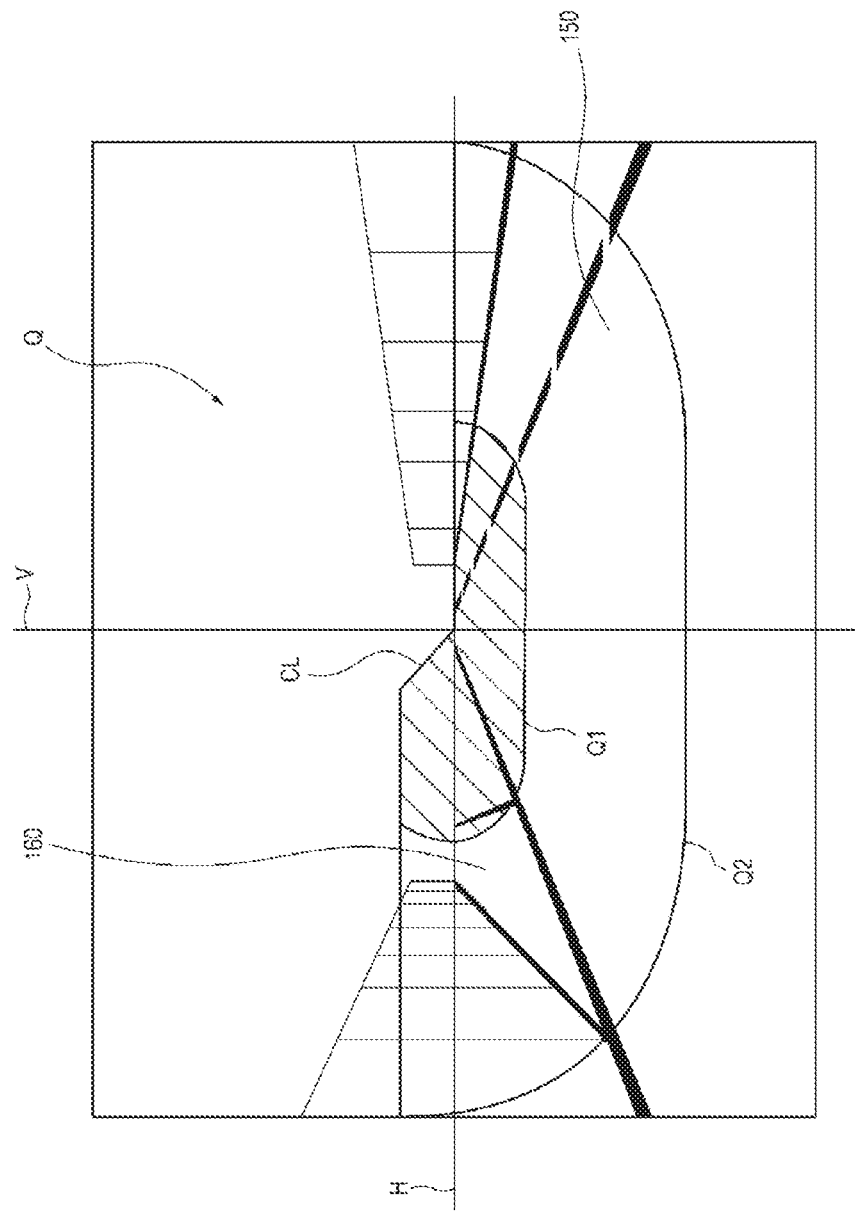
FIG. 6 is a diagram showing a second light distribution pattern formed when a manual driving mode is executed.
Figure 7:
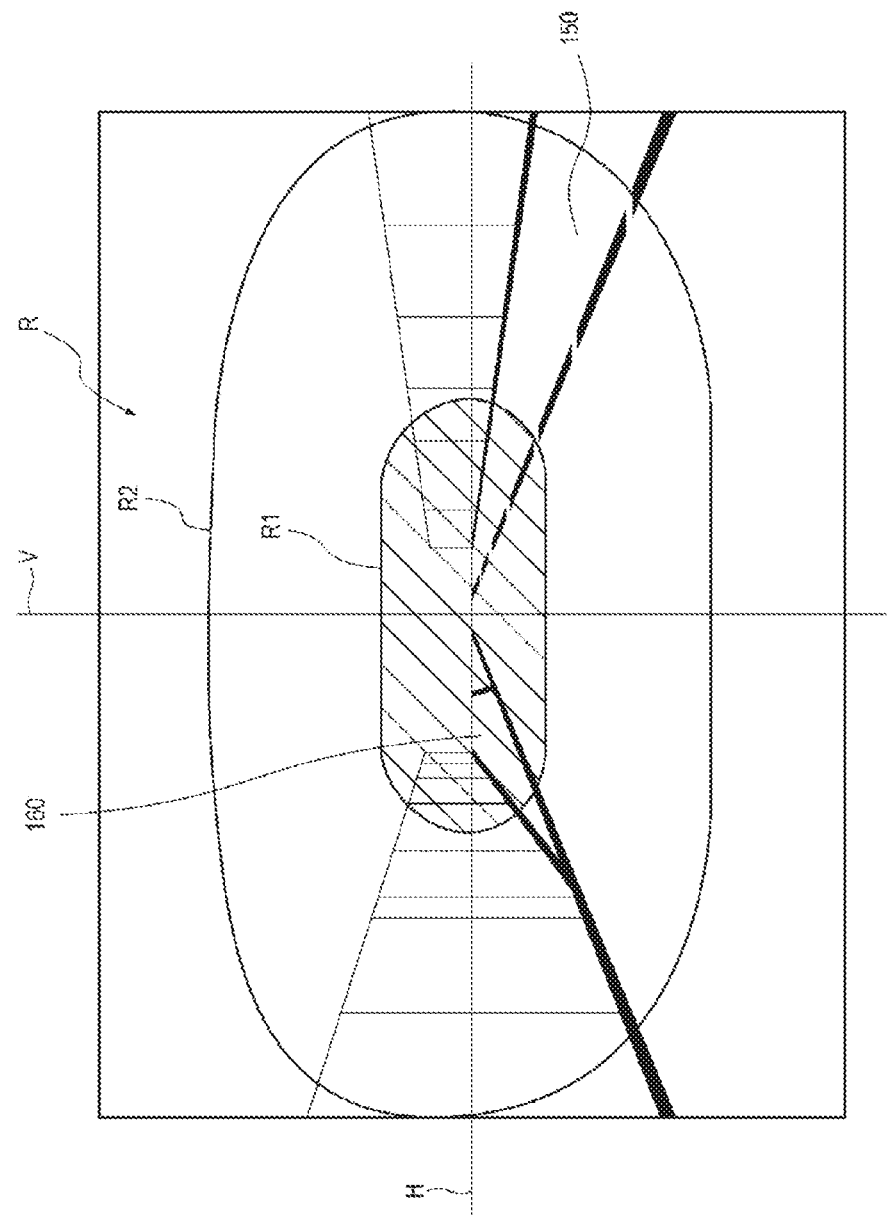
FIG. 7 is a diagram showing a third light distribution pattern formed switching from the automatic driving mode to the manual driving mode.

Next, an operation of the vehicle headlamp system 20 will be described with reference to FIGS. 4 to 7. FIG. 4 is a flowchart executed by the lamp control unit 4 of the vehicle headlamp system 20. FIGS. 5 to 7 show a situation in which the vehicle 1 traveling on a highway 150 approaches a target exit. In terms of time, this situation appears in front of the vehicle 1 in an order of FIG. 5. FIG. 7, and FIG. 6. A side road 160 for getting off the highway 150 appears in front of a left side of a traveling lane.

In FIG. 5, the vehicle 1 travels in the automatic driving mode. At this time, the first light distribution pattern P is illuminated with the headlamp 100 to the front of the vehicle 1. In FIG. 6, the vehicle 1 travels in the manual driving mode. At this time, the second light distribution pattern Q is illuminated with the headlamp 100 to the front of the vehicle 1. In FIG. 7, the driving mode of the vehicle 1 is switched from the automatic driving mode to the manual driving mode. At this time, the third light distribution pattern R is illuminated with the headlamp 100 to the front of the vehicle 1. Incidentally, a V line shown in FIGS. 5 to 7 is a straight line extending in a vertical direction through a reference line AC extending horizontally to the front of the vehicle 1 from a center position of the headlamp 100. In addition, an H line is a straight line extending in the horizontal direction through the reference line AC from the center position of the headlamp 100. Further, in FIGS. 5 to 7, the light distribution patterns are shown using a contour line of an illuminance.

FIG. 5 shows the first light distribution pattern P. In the present embodiment, the lamp control unit 4 controls the headlamp 100 so as to illuminate the first light distribution pattern P while the vehicle control unit 3 executes the automatic driving mode.

In the first light distribution pattern P, an inner area surrounded by a line P1a and an inner area surrounded by a line P1b are areas having the highest illuminance. In addition, an area below a line P2a, above a line P2b, and outside the inner areas surrounded by the line P1a and the line P1b is an area having the second highest illuminance. The areas having the highest illuminance in the first light distribution pattern P are formed so as to be divided into two parts separated in the left-right direction of the V line in the vicinity of the H line in the upper-lower direction.

Such a first light distribution pattern P can be formed, for example, by turning an optical axis direction of the left headlamp 100 and an optical axis direction of the right headlamp 100 to nearly parallel angles by the swivel mechanism 126 and moving the shade 127 to the position at which the light is not blocked by the shade driving mechanism.

FIG. 6 shows the second light distribution pattern Q. The second light distribution pattern Q is also referred to as a low beam light distribution pattern. The second light distribution pattern Q is a light distribution pattern suitable when there is an oncoming vehicle. In the present embodiment, the lamp control unit 4 is configured to form the second light distribution pattern Q after switching to the manual driving mode.

In the second light distribution pattern Q, the cut-off line CL is formed in the vicinity of the H line. The cut-off line CL is formed by shading a part of the light incident on the projection lens 123 by the shade 127. In the second light distribution pattern Q, an inner area surrounded by a line Q1 is an area having the highest illuminance. An area surrounded by the line Q1 and a line Q2 is an area having the second highest illuminance. The area having the highest illuminance in the second light distribution pattern Q is formed as a single area at a central portion in the upper-lower direction and the left-right direction.

Such a second light distribution pattern Q can be formed by turning the optical axis direction of the left headlamp 100 and the optical axis direction of the right headlamp 100 by the swivel mechanism 126 so that the optical axis directions intersects at the front, and moving the shade 127 so as to block a part of the light by the shade driving mechanism.

FIG. 7 shows the third light distribution pattern R. In the present embodiment, as will be described in detail later, the lamp control unit 4 is configured to form the third light distribution pattern R when switching from the automatic driving mode to the manual driving mode.

In the third light distribution pattern R, an inner area surrounded by a line R1 is an area having the highest illuminance. An area surrounded by the line R1 and a line R2 is an area having the next highest illuminance. Similarly to the second light distribution pattern Q in FIG. 6, the area having the highest illuminance in the third light distribution pattern R is formed as a single area at a central portion in the upper-lower direction and the left-right direction. Unlike the second light distribution pattern Q in FIG. 6, the third light distribution pattern R is not formed with the cut-off line CL.

Such a third light distribution pattern R can be formed by turning the optical axis direction of the left headlamp 100 and the optical axis direction of the right headlamp 100 by the swivel mechanism 126 so that the optical axis directions intersects at the front, and moving the shade 127 so as not to block the light by the shade driving mechanism.

Figure 8:
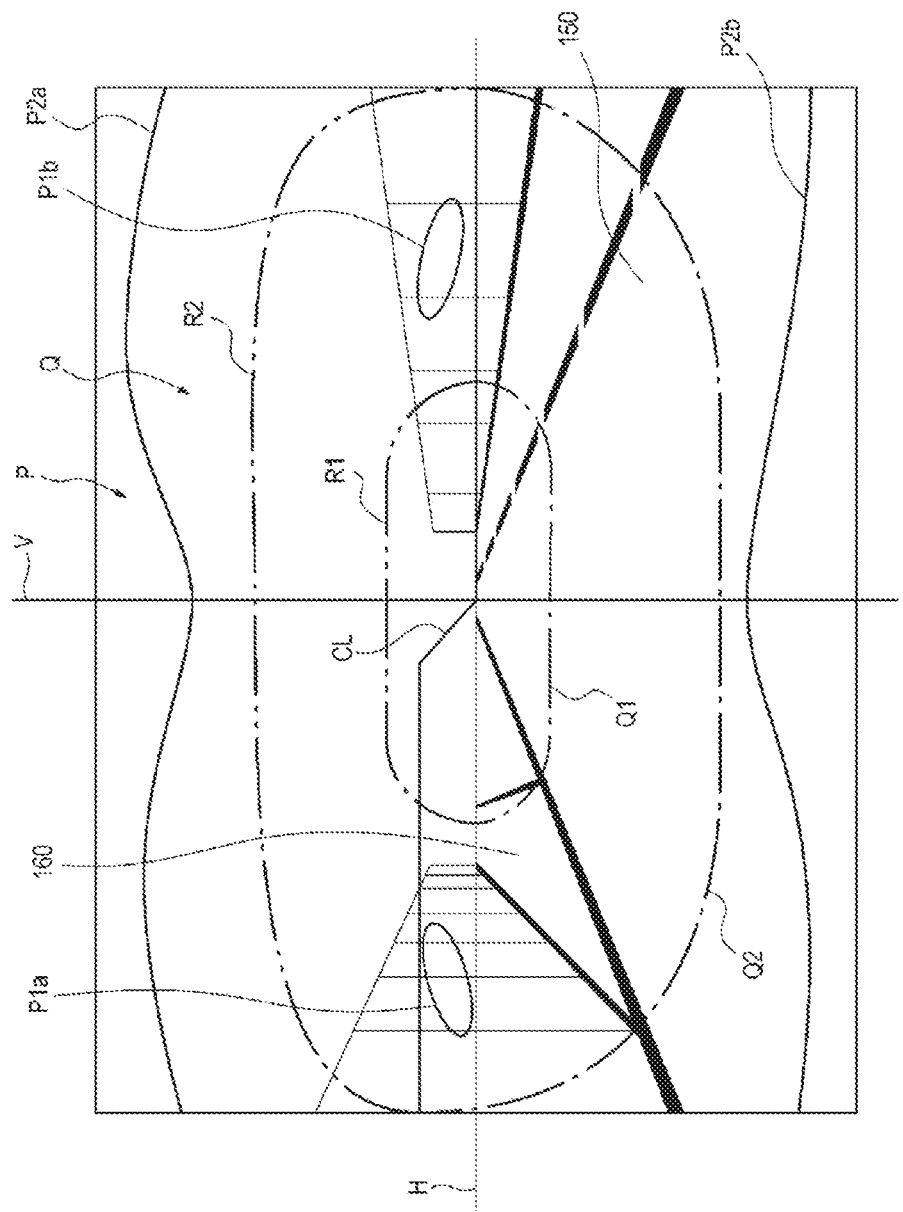
FIG. 8 is a diagram in which the first light distribution pattern, the second light distribution pattern, and the third light distribution pattern are superimposed and shown.

FIG. 8 is a virtual diagram in which the first light distribution pattern P, the second light distribution pattern Q, and the third light distribution pattern R are superimposed and drawn in order to compare these P, Q, and R to each other. In practice, such superimposed light distribution patterns are not formed. FIG. 8 is a diagram virtually created so that these light distribution patterns can be easily compared. In FIG. 8, contour lines of a first illuminance are indicated by P1a, P1b, Q1, and R1, and contour lines of a second illuminance lower than the first illuminance are indicated by P2a, P2b, Q2, and R2, respectively. In FIG. 8, the first light distribution pattern P is indicated by a solid line, the second light distribution pattern Q is indicated by a dash-dot line, and the third light distribution pattern R is indicated by a two-dot chain line.

As shown in FIG. 8, areas having the first illuminance or higher in the first light distribution pattern P are the inner area surrounded by the line P1a and the inner area surrounded by the line P1b. An area having the first illuminance or higher in the second light distribution pattern Q is the area surrounded by the line Q1. An area having the first illuminance or higher in the third light distribution pattern R is the area surrounded by the line R1. When sizes of the areas having the first illuminance or higher are compared, the third light distribution pattern R, the second light distribution pattern Q, and the first light distribution pattern P are in a descending order of the sizes. That is, the area having the first illuminance or higher in the third light distribution pattern R is larger than the area having the first illuminance or higher in the first light distribution pattern P and the area having the first illuminance or higher in the second light distribution pattern Q.

Similarly, an area having the second illuminance or higher in the first light distribution pattern P is the area surrounded by the lines P2a and P2b. An area having the second illuminance or higher in the second light distribution pattern Q is the area surrounded by the line Q2. An area having the second illuminance or higher in the third light distribution pattern R is the area surrounded by the line R2. When sizes of the areas having the second illuminance or higher are compared, the third light distribution pattern R, the first light distribution pattern P, and the second light distribution pattern Q are in a descending order of the sizes. That is, the area having the second illuminance or higher in the third light distribution pattern R is larger than the area having the second illuminance or higher in the first light distribution pattern P and the area having the first illuminance or higher in the second light distribution pattern Q.

When the second illuminance is defined as the minimum brightness obtained by regulation, the contour line of the second illuminance can be defined as an outer edge of an illumination area. In this case, the third light distribution pattern is illuminated in a range equal to or larger than an illumination area of the first light distribution pattern. In addition, the third light distribution pattern is illuminated in a range equal to or larger than an illumination area of the second light distribution pattern.

When the third light distribution pattern R is formed, the optical axis direction of the left headlamp 100 is directed toward a center of the area surrounded by the line R1, and the optical axis direction of the right headlamp 100 is also directed toward the center of the area surrounded by the line R1. That is, the center of the area surrounded by the line R1 has twice the illuminance illuminated by one headlamp 100. Therefore, the center of the area surrounded by the line R1 in the third light distribution pattern R is illuminated at an illuminance equal to or higher than the illuminance of the area surrounded by the line P1*a* in the first light distribution pattern P or the area surrounded by the line P1*b*. In addition, the center of the area surrounded by the line R1 in the third light distribution pattern R is illuminated at an illuminance equal to or higher than the illuminance of the area surrounded by the line Q1 in the second light distribution pattern Q.

When the driving mode is set to the automatic driving mode, the vehicle control unit 3 transmits an "automatic driving mode signal" indicating that the driving mode is the automatic driving mode to the lamp control unit 4. In addition, when the driving mode is set to the manual driving mode, the vehicle control unit 3 transmits a "manual driving mode signal" indicating that the driving mode is the manual driving mode to the lamp control unit 4.

The automatic driving mode here is a concept including the fully automatic driving mode and the advanced driving assistance mode. The manual driving mode is a concept including the driving assistance mode and the fully manual driving mode. The automatic driving mode and the manual driving mode here are distinguished by whether or not the driver has a sovereignty of driving the vehicle. In the fully automatic driving mode and the advanced driving assistance mode, the driver does not drive the vehicle. In the driving assistance mode and the fully manual driving mode, the driver drives the vehicle, and the vehicle control unit 3 assists the driving by the driver.

Returning to FIG. 4, the lamp control unit 4 determines whether or not the signal transmitted from the vehicle control unit 3 is the automatic driving mode signal (step S101).

In a case where it is determined that the signal is not the automatic driving mode signal (step S101: No), the lamp control unit 4 controls the headlamp 100 so as to form the second light distribution pattern Q (see FIG. 6) suitable for the manual driving mode (step S102).

On the other hand, in a case where it is determined that the signal is the automatic driving mode signal, the lamp control unit 4 controls the headlamp 100 so as to form the first light distribution pattern P (see FIG. 5) suitable for the automatic driving mode (step S103).

While the vehicle 1 is traveling in the automatic driving mode, the vehicle control unit 3 determines whether or not it is necessary to switch the driving mode from the automatic driving mode to the manual driving mode based on the external information on the vehicle 1 acquired by the sensor 5, the camera 6, the radar 7, the GPS 9, or the like. In this example, the highway is a road on which the vehicle can travel in the automatic driving mode, but is a road on which the vehicle cannot travel in the automatic driving mode from the side road 160. In this example, the vehicle control unit 3 determines whether or not it is necessary to switch from the automatic driving mode to the manual driving mode when the vehicle 1 reaches a point (a target point) before a predetermined distance from the side road 160 of the highway exit.

For example, the vehicle control unit 3 can determine whether or not the target point has been reached based on the GPS signal. Alternatively, the vehicle control unit 3 can determine whether or not the target point has been reached based on the information acquired by the camera 6 or the radar 7. Further, the vehicle control unit 3 can determine that the target point has been reached when the signal from a transmitter provided near an entrance of the side road 160 is received at a predetermined intensity or higher.

In a case where it is determined that it is not necessary to switch from the automatic driving mode to the manual driving mode, the vehicle control unit 3 maintains the automatic driving mode.

In a case where it is determined that it is necessary to switch from the automatic driving mode to the manual driving mode, the vehicle control unit 3 notifies the driver of the vehicle 1 that the manual driving mode is to be switched. The notification to the driver is performed by, for example, vibrating the steering wheel, turning on light in the vehicle, or the like. In addition, it may be notified by voice such as "please drive manually since automatic driving mode is ended". There is a case where the user cannot immediately manually drive the vehicle while the vehicle is traveling in the automatic driving mode. Therefore, when switching from the automatic driving mode to the manual driving mode, the user is notified of a notice indicating that the driving mode is to be switched, instead of immediately switching.

In addition, in a case where it is determined that it is necessary to switch from the automatic driving mode to the manual driving mode, the vehicle control unit 3 transmits a "switching notice signal" indicating that the driving mode is switched to the manual driving mode to the lamp control unit 4.

The lamp control unit 4 determines whether or not the switching notice signal has been transmitted from the vehicle control unit 3 (step S104).

In a case where it is determined that the switching notice signal has not been transmitted (step S104: No), the lamp control unit 4 repeats a process of step S104 until the switching notice signal is transmitted.

In contrast, in a case where it is determined that the switching notice signal has been transmitted (step S104: Yes), the lamp control unit 4 controls the headlamp 100 so as to form the third light distribution pattern R (see FIG. 7) (step S105).

The lamp control unit 4 continues to control the headlamp 100 so as to form the third light distribution pattern R until a mode switching completion signal is acquired (step S106). The lamp control unit 4 determines whether or not the switching completion signal has been transmitted from the vehicle control unit 3 (step S106). In a case where it is determined that the switching completion signal has not been transmitted (step S106: No), the lamp control unit 4 repeats a process of step S106 until the switching completion signal is transmitted.

In contrast, in a case where it is determined that the switching completion signal has been transmitted (step S106: Yes), the lamp control unit 4 controls the headlamp 100 so as to form the second light distribution pattern Q (step S102).

The vehicle control unit 3 transmits the "switching completion signal" to the lamp control unit 4 when the driver who is notified of switching to the manual driving mode approves the switching. Whether or not the driver has approved the switching is determined based on whether or not the driver has made a predetermined response to the above-described notification. For example, the determination is made based on whether the driver has gripped the steering wheel for manual driving, whether or not the driver has performed a switching operation of the driving mode switch, or the like.

In a case where it is determined that the predetermined response has been made to the notification, the vehicle control unit 3 switches the driving mode to the manual driving mode, and transmits the "switching completion signal" indicating that the driving mode is switched to the manual driving mode to the lamp control unit 4.

Effects

In the automatic driving mode, since an external situation can be grasped by means other than visible light such as the radar 7, the first light distribution pattern P is often different from a light distribution pattern suitable for the manual driving mode. The light distribution pattern suitable for the manual driving mode may cause glare to another vehicle, and if a headlamp of a host vehicle is too bright, a camera of the other vehicle may be less likely to recognize the host vehicle. Therefore, the first light distribution pattern P suitable for the automatic driving mode is often darker than the second light distribution pattern Q suitable for the manual driving mode. In addition, since a dark light distribution pattern has a narrow area having an illuminance equal to or higher than a predetermined threshold, the first light distribution pattern P suitable for the automatic driving mode is often narrower than the second light distribution pattern Q suitable for the manual driving mode.

When the automatic driving mode is switched to the manual driving mode, the user wants to immediately grasp the surrounding situation. However, in a situation where the first light distribution pattern P suitable for the automatic driving mode is illuminated in this way, the surroundings are dark for the user, the area illuminated by a predetermined illuminance or higher is narrow, and it is difficult for the user to immediately grasp the surrounding situation.

However, according to the vehicle headlamp system 20 of the present embodiment, when the driving mode of the vehicle 1 is transitioned from the automatic driving mode to the manual driving mode, the third light distribution pattern R brighter or wider than the first light distribution pattern P is formed. Therefore, since the driver of the vehicle 1 can start the manual driving in a state in which the third light distribution pattern R is illuminated, it is easy for the driver to grasp the surrounding situation when the manual driving is started.

In the present embodiment, in particular, the third light distribution pattern is formed when the switching notice signal is input to the lamp control unit 4. As a result, the third light distribution pattern R brighter and/or wider than the first light distribution pattern P is formed before the driving mode is actually switched. Therefore, the user can easily grasp the surrounding situation when the manual driving is started.

First Modification

In the embodiment described above, the lamp control unit 4 is configured to change from the first light distribution pattern P to the third light distribution pattern R when the mode switching notice signal is acquired (step S104). In addition, in the embodiment described above, the lamp control unit 4 is configured to change from the third light distribution pattern R to the second light distribution pattern Q when the mode switching completion signal is acquired (step S106). The present invention is not limited to this example.

Next, a first modification of the operation of the vehicle headlamp system 20 will be described with reference to FIG. 9. Incidentally, the description of the same operations as that described in the above embodiment will be appropriately omitted.

Figure 9:
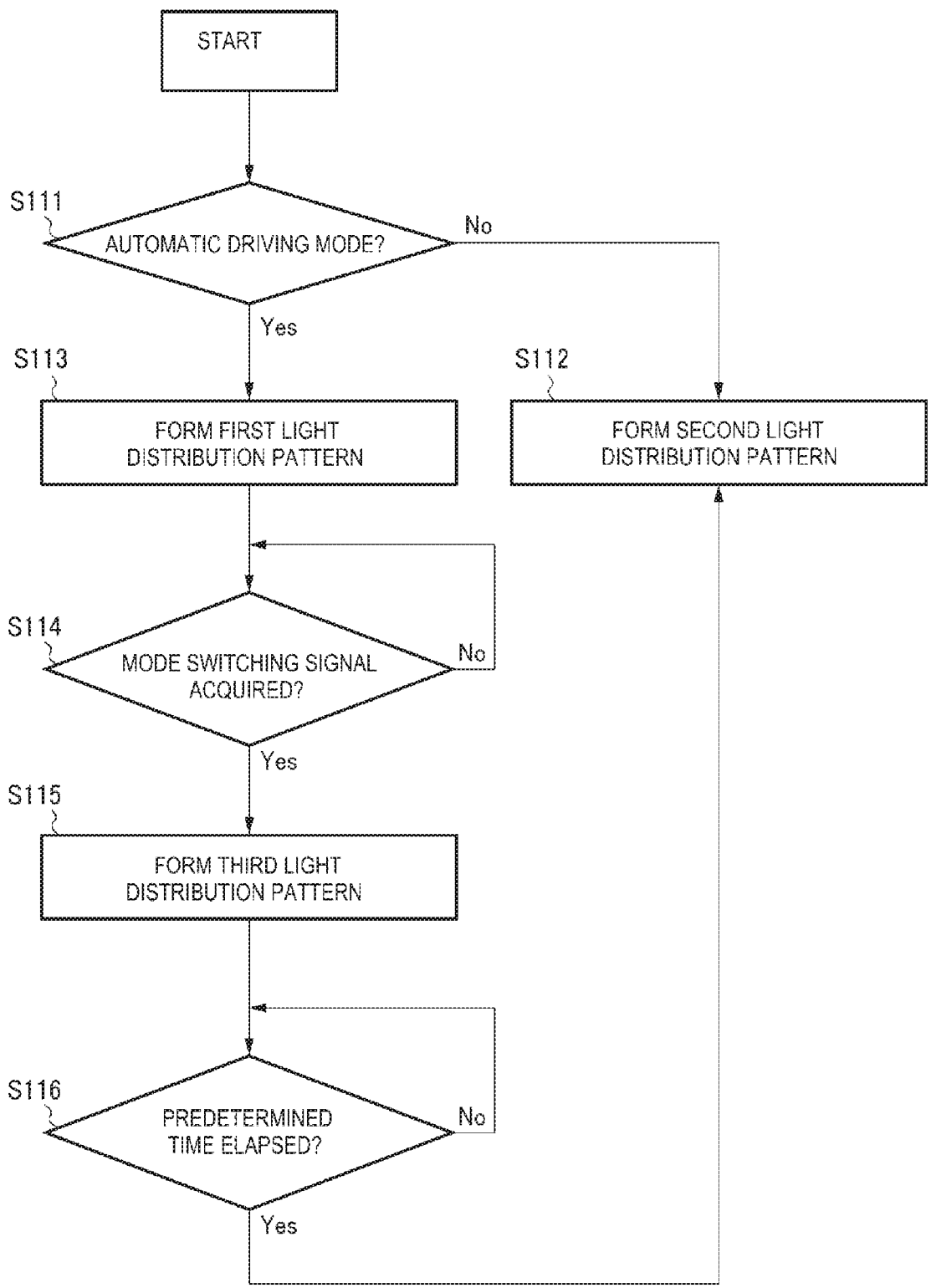
FIG. 9 is a flow chart illustrating a first modification of the operation of the vehicle headlamp system.

In FIG. 9, the operation process from step S111 to step S113 is the same as the operation process from step S101 to step S103 described with reference to FIG. 4 of the above embodiment.

In the present modification, the vehicle control unit 3 does not transmit the switching notice signal to the lamp control unit 4. When the vehicle control unit 3 determines that the driver has approved the switching, the vehicle control unit 3 switches the driving mode to the manual driving mode, and transmits a "mode switching signal" indicating that the driving mode is switched to the manual driving mode to the lamp control unit 4.

The lamp control unit 4 is configured to change from the first light distribution pattern P to the third light distribution pattern R when the mode switching signal is acquired from the vehicle control unit 3 (step S114).

When it is determined that the lamp control unit 4 has acquired the mode switching signal from the vehicle control unit 3 (step S114: Yes), the lamp control unit 4 controls the headlamp 100 so as to form the third light distribution pattern R (step S115). The lamp control unit 4 repeats the process until the mode switching signal is acquired from the vehicle control unit 3 (step S114: No).

In the present modification, the lamp control unit 4 is configured to form the second light distribution pattern Q from the third light distribution pattern R when a predetermined time has elapsed since the start of a control of forming the third light distribution pattern R without acquiring a signal from the vehicle control unit 3 (step S116). That is, the vehicle control unit 3 determines whether or not the predetermined time has elapsed since the control of forming the third light distribution pattern R is started.

In a case where it is determined that the predetermined time has not elapsed (step S116: No), the lamp control unit 4 repeats the process of step S116 until the predetermined time has elapsed.

In contrast, in a case where it is determined that the predetermined time has elapsed (step S116: Yes), the lamp control unit 4 controls the headlamp 100 so as to form the second light distribution pattern Q (step S112).

According to the vehicle headlamp system 20 of the first modification, it is possible to switch from the first light distribution pattern P to the third light distribution pattern R without outputting the mode switching notice signal from the vehicle control unit 3. In addition, it is possible to switch from the third light distribution pattern R to the second light distribution pattern Q without requiring an input from the vehicle control unit 3.

Second Modification

Although a configuration in which the vehicle control unit 3 outputs the mode switching signal indicating the driving mode of the vehicle and the mode switching notice signal, and these signals are acquired by the lamp control unit 4 has been described in the embodiment and the first modification described above, the present invention is not limited thereto.

Figure 10:
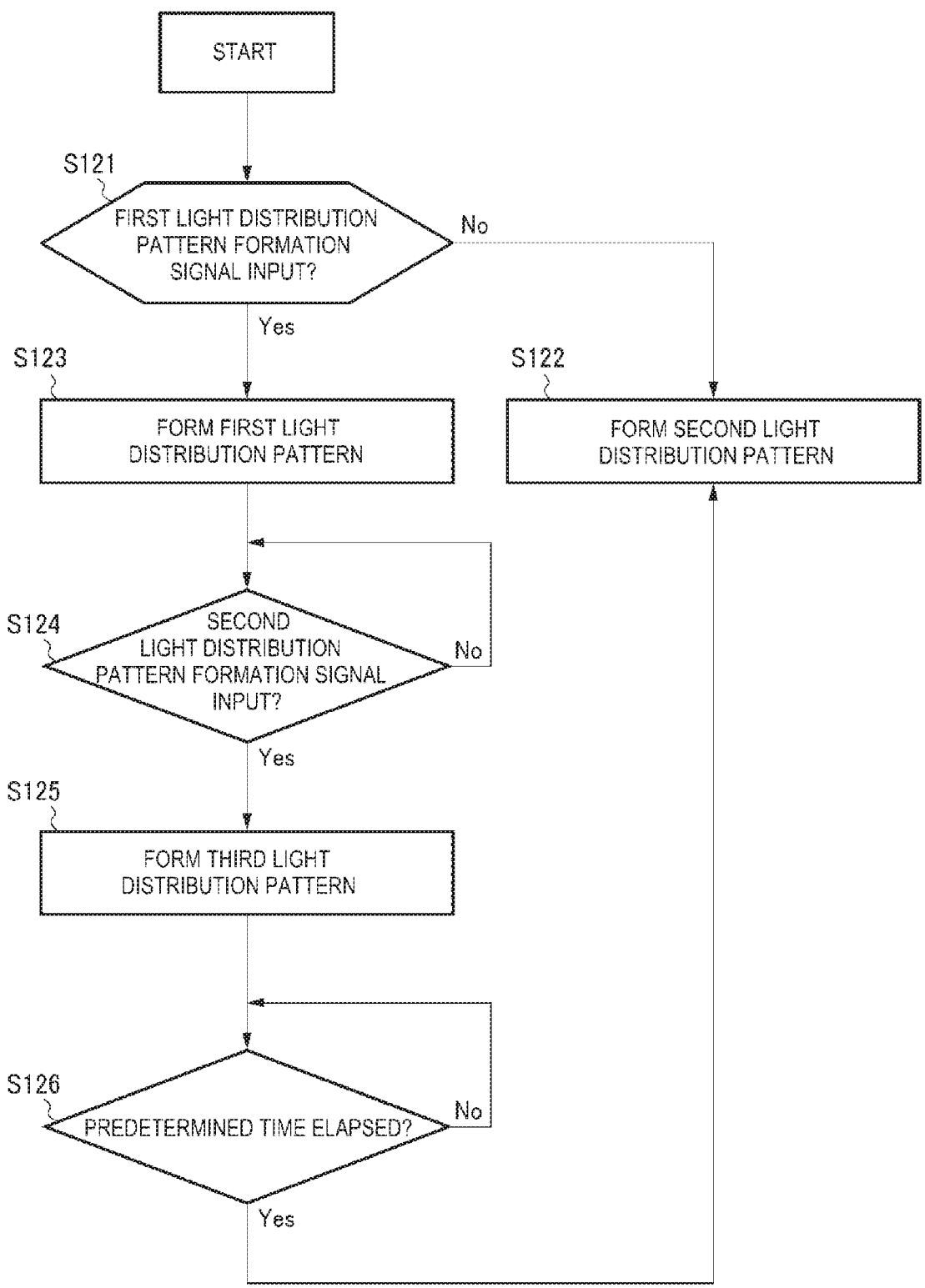
FIG. 10 is a flow chart illustrating a second modification of the operation of the vehicle headlamp system.

Next, a second modification of the operation of the vehicle headlamp system 20 will be described with reference to FIG. 10. Incidentally, the description of the same operations as that described in the above embodiment will be appropriately omitted.

In the second modification, the vehicle control unit 3 is configured not to output a signal indicating the driving mode of the vehicle, and to output only a signal indicating whether or not the first light distribution pattern P is to be formed or the second light distribution pattern Q is to be formed.

The vehicle control unit 3 transmits a signal to the lamp control unit 4 so as to form a suitable light distribution pattern according to whether or not the vehicle 1 is executing the automatic driving mode or the manual driving mode. Alternatively, a signal indicating which light distribution pattern is to be formed is output to the lamp control unit 4 according to an output of a switch for the user to select whether or not to form the first light distribution pattern P or to form the second light distribution pattern Q.

When a second light distribution pattern formation signal indicating a command to form the second light distribution pattern Q is input (step S121: No), the lamp control unit 4 controls the headlamp 100 so as to form the second light distribution pattern Q (step S122). When a first light distribution pattern formation signal indicating a command to form the first light distribution pattern P is input (step S121: Yes), the lamp control unit 4 controls the headlamp 100 so as to form the first light distribution pattern P (step S123).

Next, the lamp control unit 4 configured to control to form the first light distribution pattern P continues the control for forming the first light distribution pattern P until the second light distribution pattern formation signal is input (step S124: No).

When the second light distribution pattern formation signal is input (step S124: Yes), the lamp control unit 4 configured to control to form the first light distribution pattern P controls the headlamp 100 so as to form the third light distribution pattern R without immediately forming the second light distribution pattern Q (step S125).

The process of changing the control so as to form the second light distribution pattern Q after the predetermined time has elapsed since the start of the control of forming the third light distribution pattern R is the same as that in step S116 described in the first modification of FIG. 9.

According to the vehicle headlamp system 20 of the second modification, the vehicle control unit 3 may not be configured to output the signal indicating the automatic driving mode or the mode switching notice signal. In addition, in a case where the switch for the user to select whether or not to form the first light distribution pattern P or the second light distribution pattern Q is mounted on the vehicle 1, the present modification can be applied without modifying the vehicle 1, which is preferable.

In the present invention, the headlamp 100 is not limited to one described in FIG. 3. Any lamp corresponds to the headlamp of the present invention as long as the lamp may illuminate the front of the vehicle 1 with light in order to improve a field of view of the driver. In addition, the first light distribution pattern P, the second light distribution pattern Q, and the third light distribution pattern R are not limited to those illustrated in FIGS. 5 to 7. For example, the second light distribution pattern Q may be a so-called low-beam light distribution pattern, a high-beam light distribution pattern, or an adaptive driving beam (ADB). A shape and size of the third light distribution pattern are not limited as long as the third light distribution pattern illuminates at an illuminance equal to or higher than the illuminance of the first light distribution pattern and/or illuminates the area equal to or larger than the illumination area of the first light distribution pattern.

An intensity of the illuminance of the light distribution pattern is compared with an average value of the illuminance in the illumination area having the predetermined illuminance or higher. For example, if the illuminance of the lines P2a, P2b in FIG. 5 is equal to the illuminance of the line R2 in FIG. 7, an average illuminance of the area surrounded by the line R2 in FIG. 7 is larger than an average illuminance of the area surrounded by the line P2a and the line P2b in FIG. 5.

In addition, a size of a range of the illumination area of the light distribution pattern is compared based on a size of the range having the predetermined illuminance or higher. For example, if the illuminance of the lines P2a, P2b in FIG. 5 is equal to the illuminance of the line R2 in FIG. 7, the area surrounded by the line R2 in FIG. 7 is larger than the area surrounded by the line P2a and the line P2b in FIG. 5.

In the above description, although the case of switching from the automatic driving mode to the manual driving mode has been described on an assumption that the vehicle enters the side road 160 from the highway, the case of switching from the automatic driving mode to the manual driving mode is not limited to thereto. For example, the present invention can be applied even when switching from the automatic driving mode to the manual driving mode during road construction. The present invention can be applied regardless of a cause of switching from the automatic driving mode to the manual driving mode.

In the above description, it is assumed that the lamp control unit 4 is mounted on the headlamp 100, and the vehicle headlamp system 20 is configured as an independent system different from the vehicle system 2. However, the present invention is not limited to this configuration. For example, the vehicle lamp system may be configured as a system including the vehicle control unit 3. Alternatively, the vehicle lamp system may be configured as a system including, for example, a camera, a sensor, a radar, or the like connected to the vehicle system 2. In addition, the lamp control unit 4 may be configured as a part of the ECU configuring the vehicle control unit 3. In this case, the lamp control unit 4 is mounted on the vehicle 1 instead of the headlamp 100.

Second Embodiment

Next, a vehicle lamp system 1020 according to a second embodiment of the present invention will be described.

In the vehicle capable of executing both the manual driving mode and the automatic driving mode, a vehicle control unit may switch to the manual driving mode due to some reason during the execution of the automatic driving mode. At this time, the user of the vehicle that is to be driven manually may not know what to pay attention to when driving.

Therefore, the present embodiment provides the vehicle lamp system 1020 that allows the user to easily grasp what to pay attention to when the driving from automatic driving to manual driving.

Figure 11A:
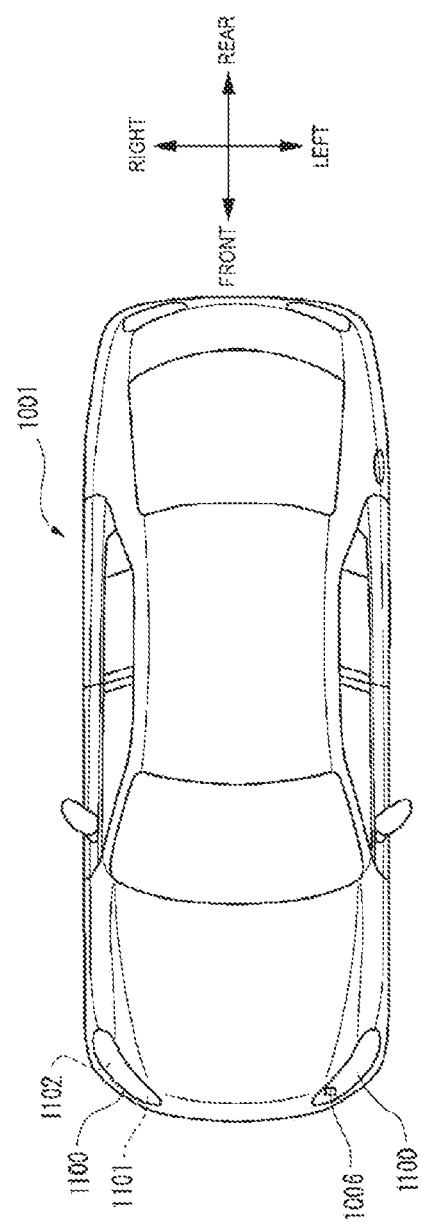
FIG. 11A is a top view of a vehicle including a vehicle lamp system according to an embodiment of the present invention.
Figure 11B:
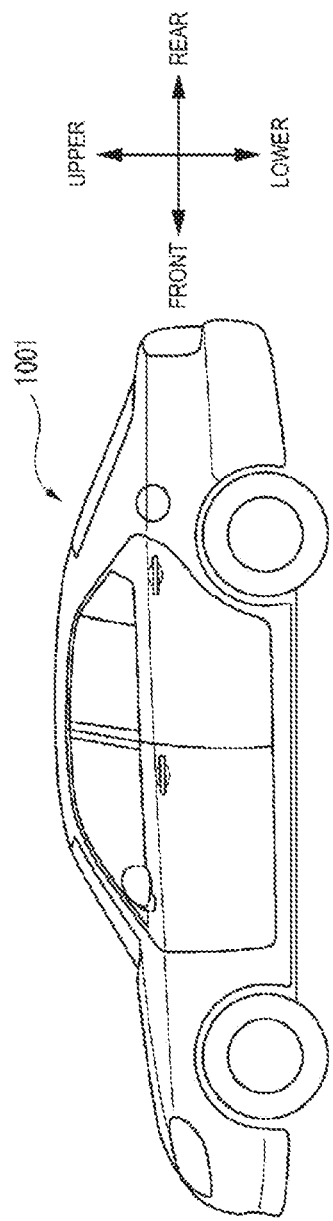
FIG. 11B is a side view of the vehicle including the vehicle lamp system according to the embodiment of the present invention.

FIG. 11A is a top view of a vehicle 1001 on which the vehicle lamp system 1020 according to the present embodiment is mounted. FIG. 11B is a side view of the vehicle 1001 on which the vehicle lamp system 1020 according to the present embodiment is mounted. The vehicle 1001 is an automobile that can travel in the automated driving mode. The vehicle 1001 is equipped with lamp units 1100 having built-in headlamps (HL) 1101 at left and right front portions. Each of the lamp unit 1100 incorporates a road surface drawing lamp 1102 (an example of a lamp) together with the headlamp 1101.

A block diagram of a vehicle lamp system 1020 of the present embodiment is the same as the block diagram of the vehicle headlamp system 20 of the first embodiment shown in FIG. 2. Therefore, members of the second embodiment are denoted by reference numerals obtained by adding 1000 to the reference numerals of the corresponding members of the first embodiment, and a repetitive description thereof will be omitted.

Figure 12:
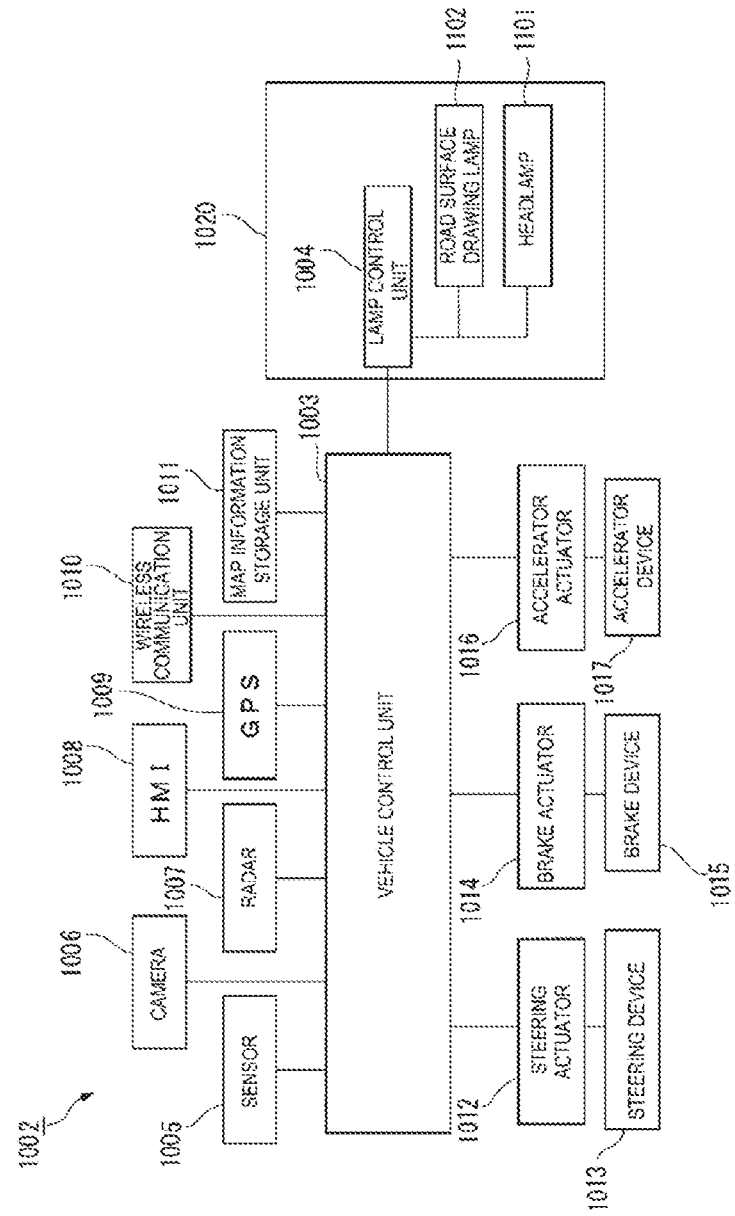
FIG. 12 is a block diagram of a vehicle system and the vehicle lamp system.

Next, the vehicle lamp system 1020 of the vehicle 1001 will be described with reference to FIG. 12. As shown in FIG. 12, the vehicle lamp system 1020 includes the headlamp 1101, the road surface drawing lamp 1102, and a lamp control unit 1004 that controls a lamp including the headlamp 1101 and the road surface drawing lamp 1102.

The lamp control unit 1004 is connected to a vehicle control unit 1003, and is configured to control an operation of the headlamp 1101 and the road surface drawing lamp 1102 based on a signal transmitted from the vehicle control unit 1003. For example, the lamp control unit 1004 can control the headlamp 1101 based on the signal transmitted from the vehicle control unit 1003, and cause the headlamp 1101 to emit light in a predetermined light distribution pattern. In addition, the lamp control unit 1004 can control the road surface drawing lamp 1102 based on the signal transmitted from the vehicle control unit 1003, and cause the road surface drawing lamp 1102 to emit light so as to point to a predetermined object.

Figure 13:
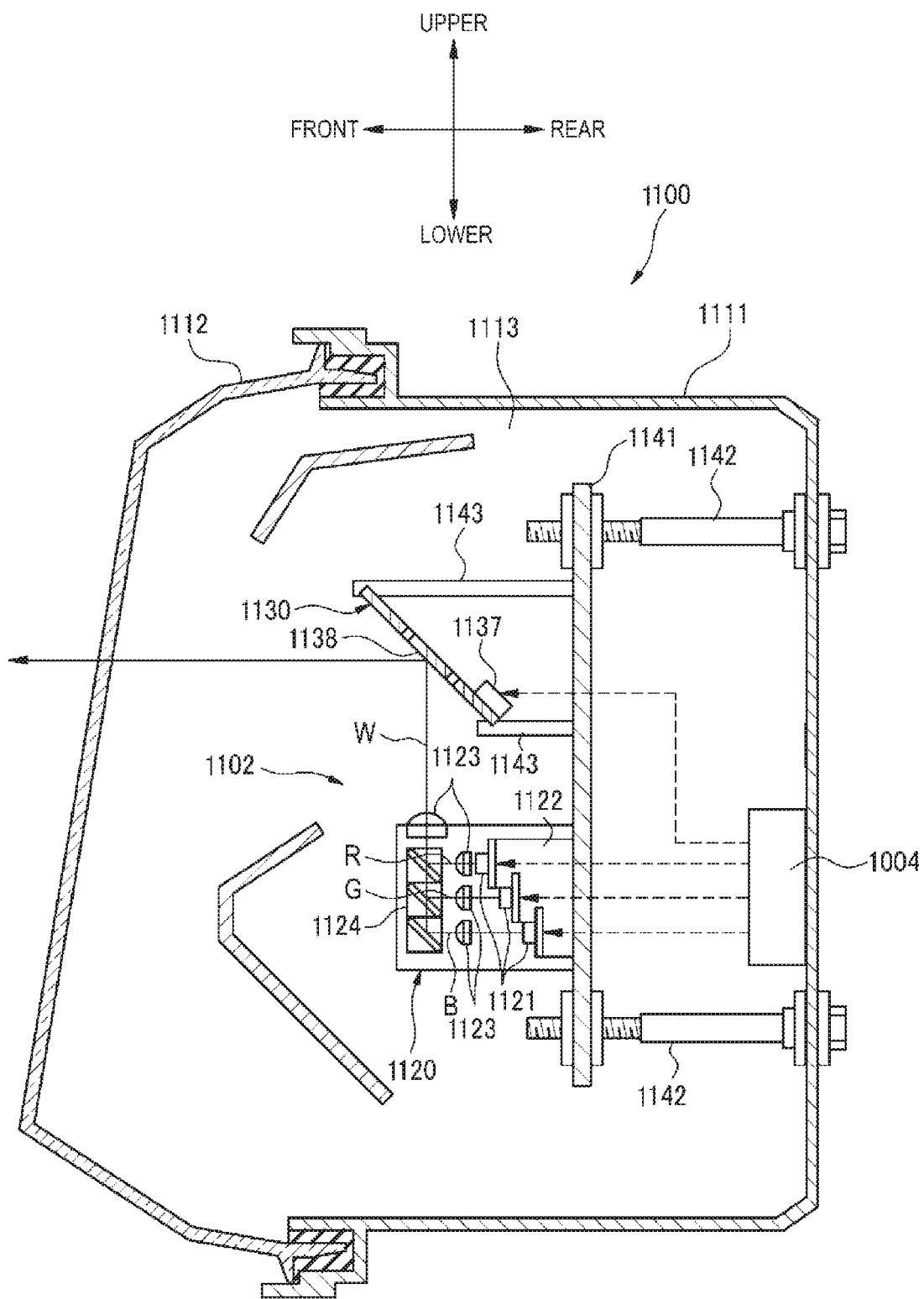
FIG. 13 is a vertical sectional view of a road surface drawing lamp.

FIG. 13 is a vertical sectional view showing a schematic configuration of the road surface drawing lamp 1102 incorporated in the lamp unit 1100. As shown in FIG. 13, the lamp unit 1100 includes a lamp body 1111 having an opening portion at a front side of the vehicle, and a transparent front cover 1112 attached so as to cover the opening portion of the lamp body 1111. The road surface drawing lamp 1102, the lamp control unit 1004, or the like are accommodated inside a lamp chamber 1113 formed by the lamp body 1111 and the front cover 1112. Although not shown in the sectional view of FIG. 13, the headlamp 1101 is also accommodated inside the lamp chamber 1113 like the road surface drawing lamp 1102.

The road surface drawing lamp 1102 includes a light source unit 1120 and a light distribution unit 1130 that reflects light from the light source unit 1120. The light source unit 1120 and the light distribution unit 1130 are supported at predetermined positions in the lamp chamber 1113 by a support plate 1141. The support plate 1141 is attached to the lamp body 1111 via an aiming screw 1142.

The light source unit 1120 includes a plurality of (three in this example) light sources 1121, a heat sink 1122, a plurality of (four in this example) lenses 1123, and a light collection unit 1124. The light source unit 1120 is fixed to a front surface of the support plate 1141. Each of the light sources 1121 is electrically connected to the lamp control unit 1004.

The light distribution unit 1130 includes a terminal portion 1137 and a reflection mirror 1138. A positional relationship between the light distribution unit 1130 and the light source unit 1120 is determined such that laser light emitted from the light source unit 1120 can be reflected forward of the road surface drawing lamp 1102 via the reflection mirror 1138. The light distribution unit 1130 is fixed to a tip end of a protruding portion 1143 protruding forward from the front surface of the support plate 1141. The terminal portion 1137 is electrically connected to the lamp control unit 1004.

The lamp control unit 1004 is fixed to the lamp body 1111 on a rear side of the support plate 1141. Incidentally, a position where the lamp control unit 1004 is provided is not limited to the above position. The road surface drawing lamp 1102 is configured such that the optical axis can be adjusted in the horizontal and vertical directions by rotating the aiming screw 1142 to adjust an attitude of the support plate 1141.

Figure 14:
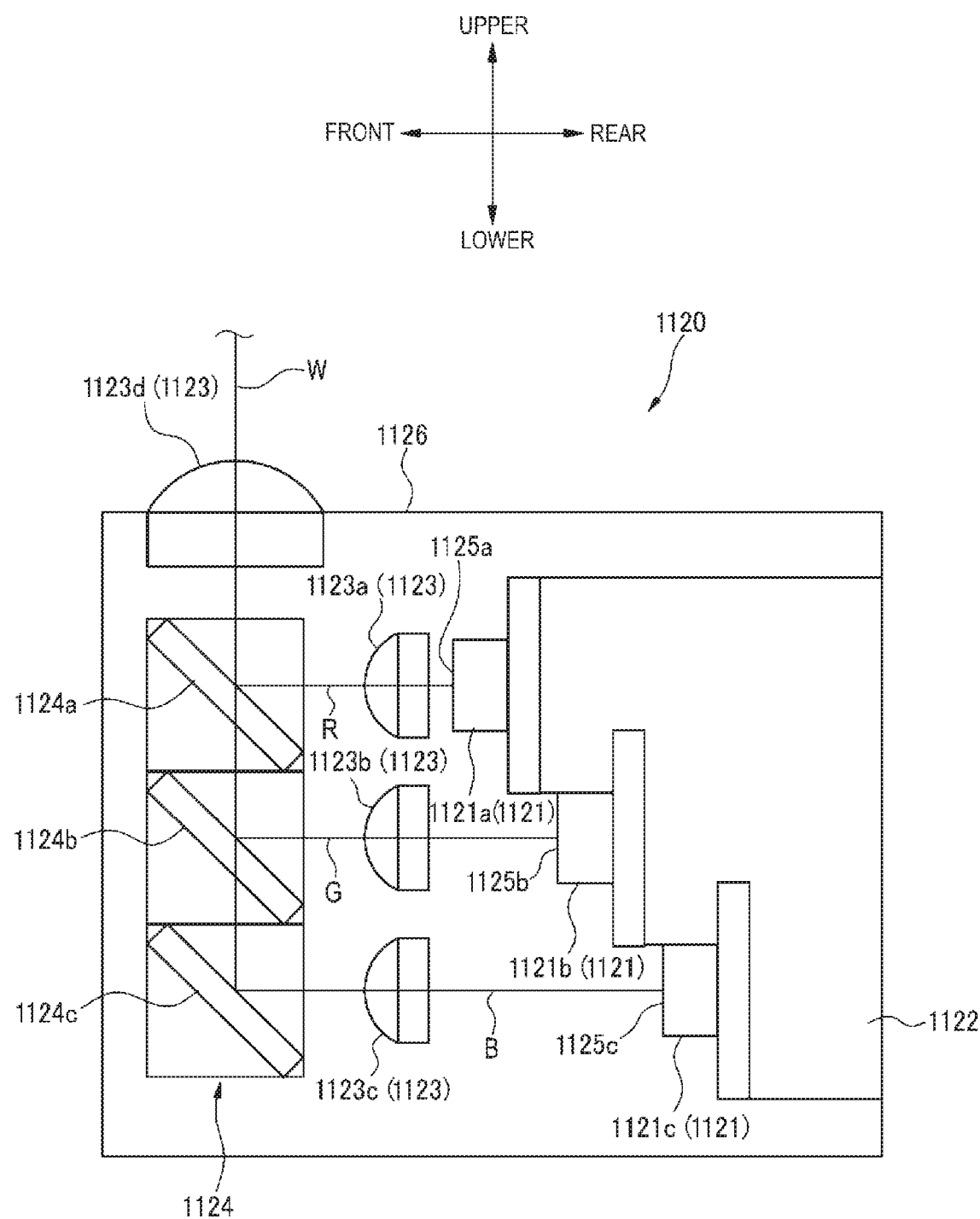
FIG. 14 is a side view showing a configuration of a light source unit of the road surface drawing lamp.

FIG. 14 is a side view of the light source unit 1120 configuring the road surface drawing lamp 1102. As shown in FIG. 14, the light source unit 1120 includes a first light source 1121a, a second light source 1121b, a third light source 1121c, the heat sink 1122, a first lens 1123a, a second lens 1123b, a third lens 1123c, a fourth lens 1123d, and the light collection unit 1124.

The first light source 1121a is a light source that emits red laser light R, and is configured by a light emitting element including a red laser diode. Similarly, the second light source 1121b is configured by a green laser diode that emits green laser light G, and the third light source 1121c is configured by a blue laser diode that emits blue laser light B. The first light source 1121a, the second light source 1121b, and the third light source 1121c are arranged such that a laser light emitting surface 1125a, a laser light emitting surface 1125b, and a laser light emitting surface 1125c, which are light emitting surfaces, are parallel to each other. Incidentally, the light emitting element of each of the light sources is not limited to the laser diode.

The first to third light sources 1121a to 1121c are arranged such that the respective laser light emitting surfaces 1125a to 1125c face the front of the road surface drawing lamp 1102, and are attached to the heat sink 1122. The heat sink 1122 is formed of a material having a high thermal conductivity such as aluminum, and is attached to the light source unit 1120 in a state in which a rear surface of the heat sink 1122 is in contact with the support plate 1141 (see FIG. 13).

The first to fourth lenses 1123a to 1123d are formed of, for example, a collimating lens. The first lens 1123a is provided on an optical path of the red laser light R between the first light source 1121a and the light collection unit 1124, converts the red laser light R emitted from the first light source 1121a into parallel light, and emits the parallel light to the light collection unit 1124. The second lens 1123b is provided on an optical path of the green laser light G between the second light source 1121b and the light collection unit 1124, converts the green laser light G emitted from the second light source 1121b into parallel light, and emits the parallel light to the light collection unit 1124.

The third lens 1123c is provided on an optical path of the blue laser light B between the third light source 1121c and the light collection unit 1124, converts the blue laser light B emitted from the third light source 1121c into parallel light, and emits the parallel light to the light collection unit 1124. The fourth lens 1123d is fitted into an opening provided at an upper portion of a box body 1126 of the light source unit 1120. The fourth lens 1123d is provided on an optical path of white laser light W (described later) between the light collection unit 1124 and the light distribution unit 1130 (see FIG. 13), converts the white laser light W emitted from the light distribution unit 1124 into parallel light, and emits the parallel light to the light distribution unit 1130.

The light collection unit 1124 collects the red laser light R, the green laser light G, and the blue laser light B to generate the white laser light W. The light collection unit 1124 includes a first dichroic mirror 1124a, a second dichroic mirror 1124b, and a third dichroic mirror 1124c.

The first dichroic mirror 1124a is a mirror that reflects at least red light and transmits the blue light and the green light, and is arranged so as to reflect the red laser light R passing through the first lens 1123a toward the fourth lens 1123d. The second dichroic mirror 1124b is a mirror that reflects at least green light and transmits the blue light, and is arranged so as to reflect the green laser light G passing through the second lens 1123b toward the fourth lens 1123d. The third dichroic mirror 1124c is a mirror that reflects at least blue light, and is arranged so as to reflect the blue laser light B passing through the third lens 1123c toward the fourth lens 1123d.

A positional relationship between the first dichroic mirror 1124a to the third dichroic mirror 1124c is determined such that the optical paths of the respective reflected laser light are parallel to each other, and the respective laser light is collected and incident on the fourth lens 1123d. In this example, the first dichroic mirror 1124a to the third dichroic mirror 1124c are arranged such that areas (a reflection point of the laser light) in the dichroic mirrors 1124a to 1124c that are irradiated with the laser light are aligned in a straight line.

The blue laser light B emitted from the third light source 1121c is reflected by the third dichroic mirror 1124c and proceeds to a second dichroic mirror 1124b side. The green laser light G emitted from the second light source 1121b is reflected by the second dichroic mirror 1124b toward a first dichroic mirror 1124a side, and is superimposed on the blue laser light B transmitted through the second dichroic mirror 1124b. The red laser light R emitted from the first light source 1121a is reflected by the first dichroic mirror 1124a toward a fourth lens 1123d side, and is superimposed on the aggregated light of the blue laser light B and the green laser light G transmitted through the first dichroic mirror 1124a. As a result, the white laser light W is formed, and the formed white laser light W passes through the fourth lens 1123d and proceeds toward the light distribution unit 1130.

In the first light source 1121a to the third light source 1121c, the first light source 1121a that emits the red laser light R is arranged at a position closest to the light collection unit 1124, and the third light source 1121c that emits the blue laser light B is arranged at a position farthest from the light collection unit 1124, and the second light source 1121b that emits the green laser light G is arranged at an intermediate position. That is, the first light source 1121a to the third light source 1121c are arranged at positions closer to the light collection unit 1124 as a wavelength of the emitted laser light becomes longer.

Figure 15:
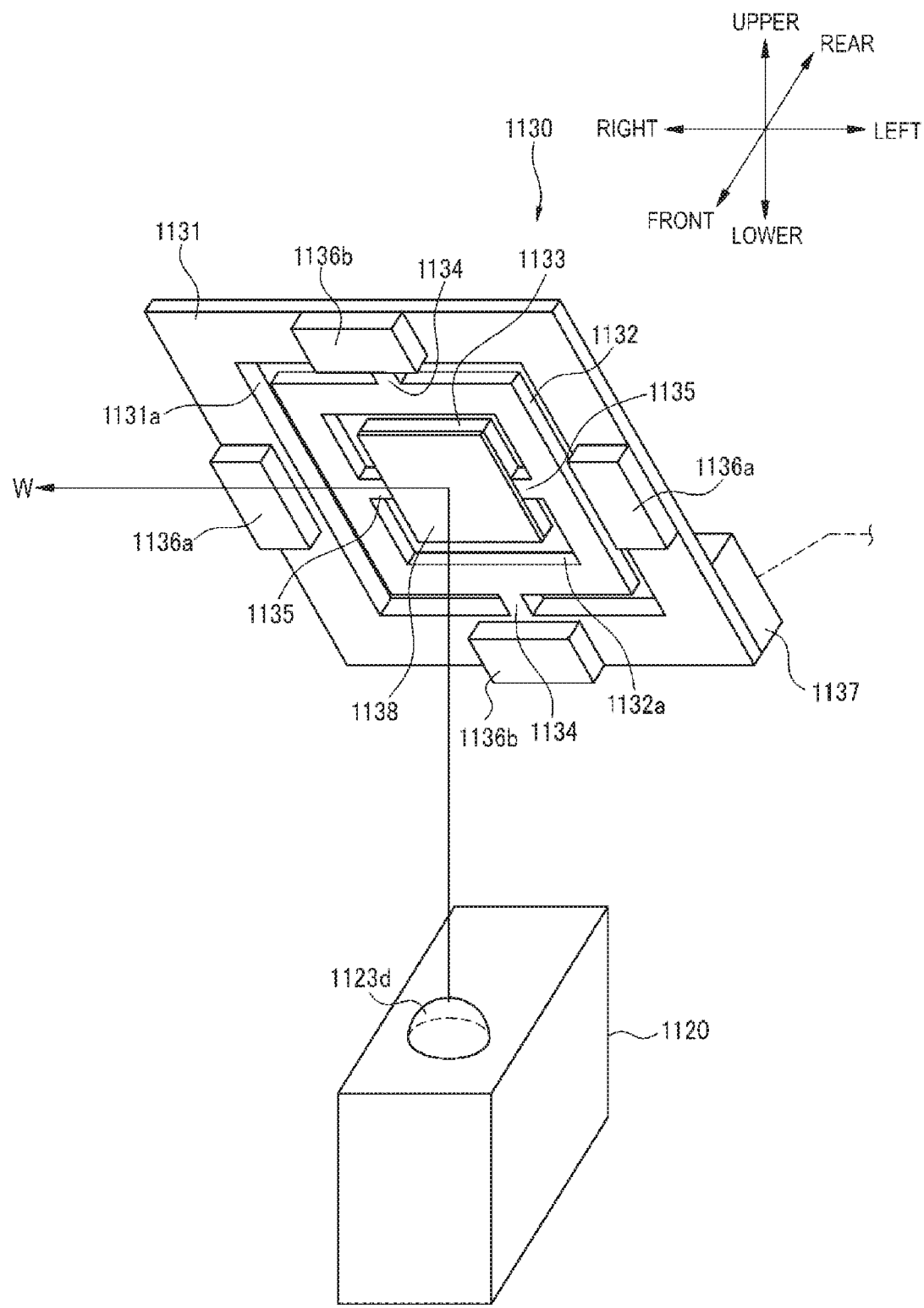
FIG. 15 is a perspective view showing a configuration of a light distribution unit of the road surface drawing lamp.

FIG. 15 is a perspective view when the light distribution unit 1130 forming the road surface drawing lamp 1102 is observed from the front side. As shown in FIG. 15, the light distribution unit 1130 includes a base 1131, a first rotating body 1132, a second rotating body 1133, first torsion bars 1134, second torsion bars 1135, permanent magnets 1136a, 1136b, the terminal portion 1137, and the reflection mirror 1138. The light distribution unit 1130 is configured by a galvanometer mirror, for example. Incidentally, the light distribution unit 1130 may be configured by a MEMS (MEMS) mirror, for example.

The base 1131 is a frame body having an opening portion 1131a at a center thereof, and is fixed to the protruding portion 1143 (see FIG. 13) in a state of being inclined in the front-rear direction of the road surface drawing lamp 1102. The first rotating body 1132 is arranged on the opening portion 1131a of the base 1131. The first rotating body 1132 is a frame body having an opening portion 1132a at a center thereof, and is supported by the first torsion bars 1134 extending from a rear lower side to a front upper side of the road surface drawing lamp 1102 so as to be rotatable in the left-right direction (a vehicle width direction) with respect to the base 1131.

The second rotating body 1133 is arranged on the opening portion 1132a of the first rotating body 1132. The second rotating body 1133 is a rectangular flat plate and is supported by the second torsion bars 1135 extending in the vehicle width direction so as to be rotatable in the upper-lower direction (the vertical direction) with respect to the first rotating body 1132. When the first rotating body 1132 rotates left and right about the first torsion bars 1134 as a rotation axis, the second rotating body 1133 rotates right and left together with the first rotating body 1132. The reflection mirror 1138 is provided on a surface of the second rotating body 1133 by plating, vapor deposition, or the like.

The base 1131 is provided with a pair of permanent magnets 1136a at positions orthogonal to extending directions of the first torsion bars 1134. Each of the permanent magnets 1136a forms a magnetic field orthogonal to the corresponding first torsion bar 1134. A first coil (not shown) is wired to the first rotating body 1132, and the first coil is connected to the lamp control unit 1004 via the terminal portion 1137. In addition, the base 1131 is provided with a pair of permanent magnets 1136b at positions orthogonal to extending directions of the second torsion bars 1135. Each of the permanent magnets 1136b forms a magnetic field orthogonal to the corresponding second torsion bar 1135. A second coil (not shown) is wired to the second rotating body 1133, and the second coil is connected to the lamp control unit 1004 via the terminal portion 1137.

By controlling a mount and a direction of current flowing through the first coil and the second coil, the first rotating body 1132 and the second rotating body 1133 perform reciprocating rotation in the left-right directions, and the second rotating body 1133 independently performs the reciprocating rotation in the upper-lower direction. This causes the reflection mirror 1138 to perform the reciprocating rotation in the upper-lower and left-right directions.

A positional relationship between the light source unit 1120 and the light distribution unit 1130 is determined such that the white laser light W emitted from the light source unit 1120 is reflected by the reflection mirror 1138 toward the front of the road surface drawing lamp 1102. The light distribution unit 1130 scans the front of the vehicle 1001 with the white laser light W by the reciprocating rotation of the reflection mirror 1138. For example, the light distribution unit 1130 scans an area of a drawing pattern to be formed with the white laser light W. As a result, the white laser light W is distributed to a forming area of the drawing pattern, and a predetermined drawing pattern is formed in front of the vehicle 1001 (for example, toward a predetermined object).

Figure 16:
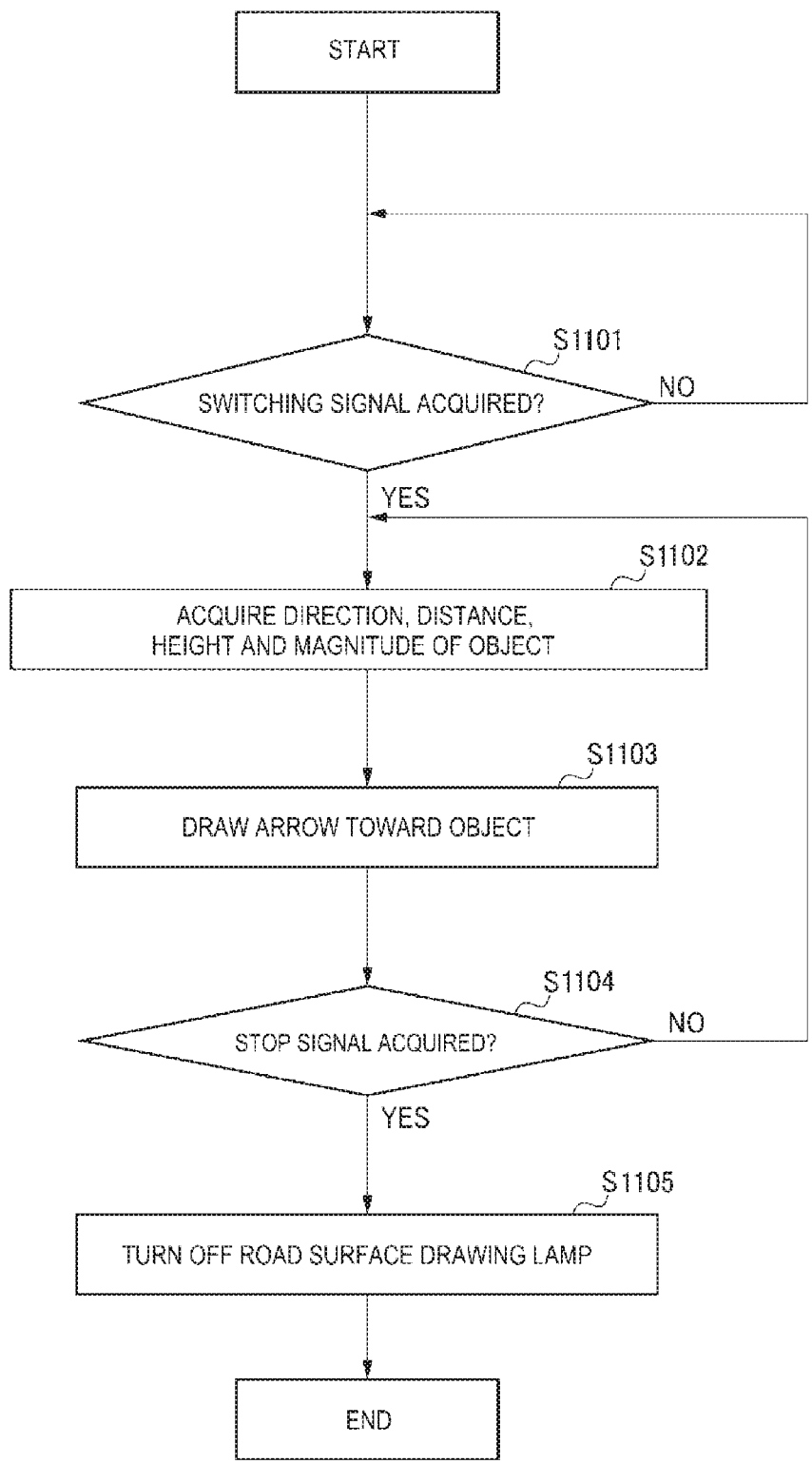
FIG. 16 is a flow chart executed by a lamp control unit of the road surface drawing lamp.
Figure 17:
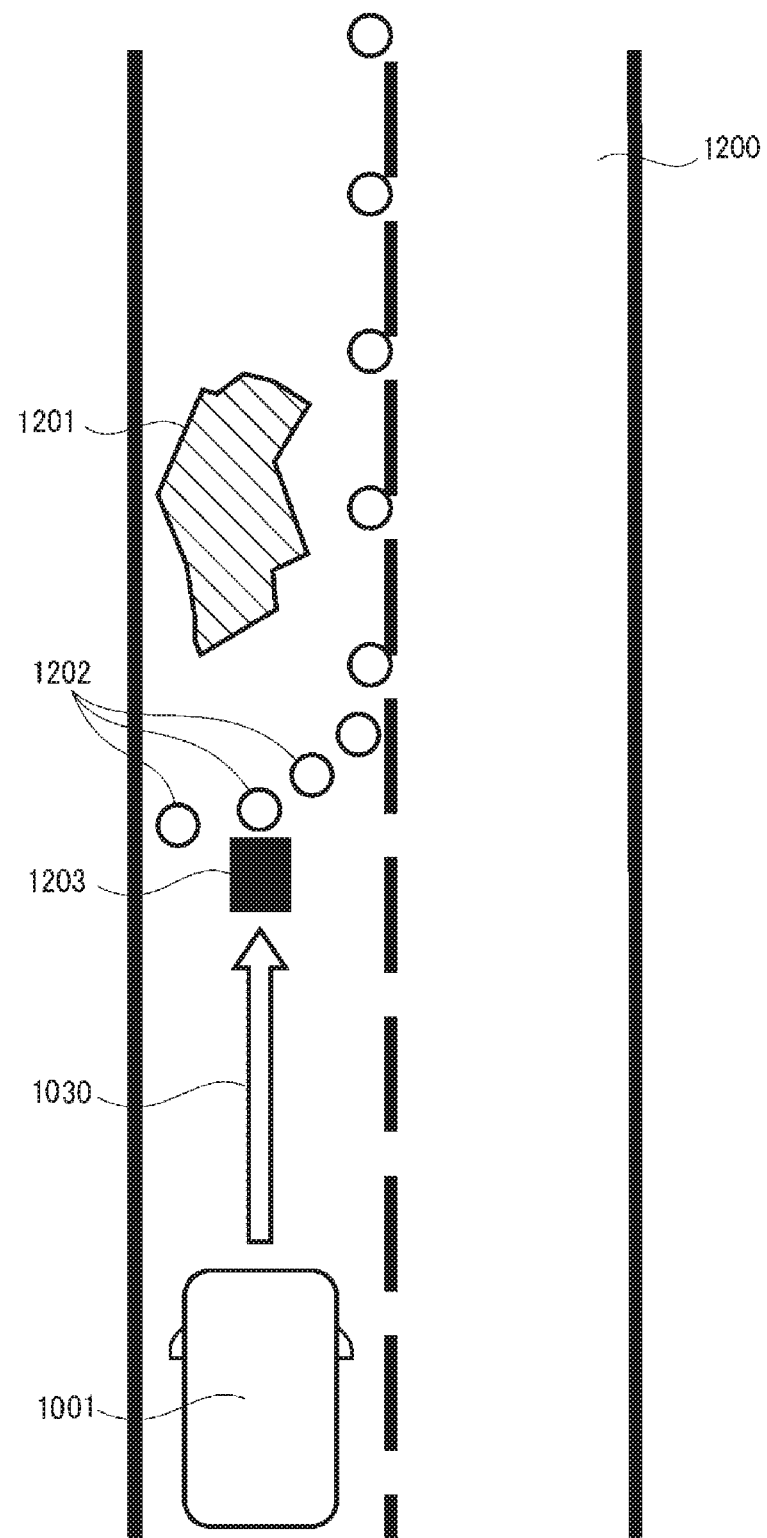
FIG. 17 is a diagram showing an example of road surface drawing drawn by the road surface drawing lamp.

Next, the vehicle lamp system 1020 will be described with reference to FIGS. 16 and 17. FIG. 16 is a flow chart executed by the lamp control unit 1004. FIG. 17 shows an example of road surface drawing drawn by the road surface drawing lamp 1102.

The vehicle control unit 1003 when executing the automatic driving mode is configured to switch from the automatic driving mode to the manual driving mode in a specific situation. For example, in a case where the road is wider constriction, there are many people who perform irregular movement as compared with a normal road. Therefore, there is a high possibility that a situation other than the situation assumed in advance may occur, and the automatic driving mode is not suitable. In the situation in which a sudden situation is highly likely to occur, the manual driving mode in which judgment is made freely is suitable. Based on this idea, the vehicle control unit 1003 is configured to switch from the automatic driving mode to the manual driving mode when the road is under construction.

The automatic driving mode here is the concept including the fully automatic driving mode and the advanced driving assistance mode. The manual driving mode is the concept including the driving assistance mode and the fully manual driving mode. The automatic driving mode and the manual driving mode here are distinguished by whether or not the driver has a sovereignty of driving the vehicle. In the fully automatic driving mode and the advanced driving assistance mode, the driver does not drive the vehicle, in the driving assistance mode and the fully manual driving mode, the driver drives the vehicle, and the vehicle control unit 1003 assists the driving by the driver.

FIG. 17 shows a road 1200 during construction. In FIG. 17, a depression 1201 is formed on the road 1200, and construction for repairing the depression 1201 is performed. For this construction, color cones 1202 (registered trademark) are lined up, and for example, a signboard 1203 indicating that the road is under construction is installed. Hereinafter, a situation in which the vehicle 1001 traveling on the road 1200 in the automatic driving mode approaches a place during construction will be described.

The vehicle control unit 1003 of the vehicle 1001 recognizes that the signboard 1203 is installed on the road based on external information on the vehicle 1001 acquired by the sensor 1005, the camera 1006, the radar 1007, or the like. When the signboard 1203 is recognized, the vehicle control unit 1003 is configured to determine to switch the driving mode of the vehicle 1001 from the automatic driving mode to the manual driving mode. As described above, the one (the signboard 1203 in the present embodiment) specified as the cause by which the vehicle control unit 1003 switches the driving mode of the vehicle 1001 from the automatic driving mode to the manual driving mode is referred to as a "switching object".

When the switching object is recognized, the vehicle control unit 1003 transmits a "switching signal" indicating that the driving mode of the vehicle 1001 is switched from the automatic driving mode to the manual driving mode, to the lamp control unit 1004. In addition, the vehicle control unit 1003 transmits information on the signboard 1203 that is the switching object to the lamp control unit 1004 together with the switching signal or transmits the information on the signboard 1203 so as to be continuous after transmitting the switching signal.

The information on the signboard 1203 includes, for example, information on a direction of the signboard 1203, a distance to the signboard 1203, a height at which the signboard 1203 is installed, a size of the signboard 1203, or the like, as viewed from the host vehicle. Incidentally, the vehicle control unit 1003 may transmit all of a plurality of pieces of information acquired about the signboard 1203 to the lamp control unit 1004, or may be configured to transmit only a part of the information to the lamp control unit 1004.

As shown in FIG. 16, first, the lamp control unit 1004 determines whether or not the switching signal has been transmitted from the vehicle control unit 1003 (step S1101).

In a case where it is determined that the switching signal has not been transmitted (step S1101: No), the lamp control unit 1004 repeats the process of step S1101 until the switching signal is transmitted.

In contrast, in a case where it is determined that the switching signal has been transmitted (step S1101: Yes), the lamp control unit 1004 acquires the information on the signboard 1203 transmitted together with the switching signal (step S1102). Here, the lamp control unit 1004 is configured to acquire at least information on the direction of the signboard 1203 from the vehicle control unit 1003.

The lamp control unit 1004 specifies a position of the signboard 1203 based on the acquired information. The lamp control unit 1004 controls the road surface drawing lamp 1102 to emit light toward the identified signboard 1203. For example, the lamp control unit 1004 controls the road surface drawing lamp 1102 to draw an arrow 1030 on the road surface so as to point to the signboard 1203 as shown in FIG. 17 (step S1103).

The information on the signboard 1203 transmitted from the vehicle control unit 1003 to the lamp control unit 1004 is updated in accordance with traveling of the vehicle 1001. Therefore, the lamp control unit 1004 continues to control the road surface drawing lamp 1102 based on the updated information, and changes a drawing form (for example, a length and a direction of the arrow, or the like) of the arrow 1030 indicating the road surface drawing lamp 1102 pointing to the signboard 1203 every moment.

The lamp control unit 1004 is configured to continue to execute the road surface drawing described above until a stop signal is acquired from the vehicle control unit 1003 (step S1104). When the stop signal is acquired from the vehicle control unit 1003 (step S1104: Yes), the lamp control unit 1004 stops executing the road surface drawing. In the present embodiment, the road surface drawing lamp 1102 is turned off (step S1105).

In the present embodiment, the vehicle control unit 1003 is configured to transmit the stop signal to the lamp control unit at a later timing of a timing after a predetermined time has elapsed since after switching from the automatic driving mode to the manual driving mode, or a timing when the switching object is out of a detection range of the sensor 1005, the camera 1006, and the radar 1007 according to the traveling of the vehicle.

When the vehicle control unit 1003 determines to switch the driving mode from the automatic driving mode to the manual driving mode, the vehicle control unit 1003 notifies the driver (the user) of the vehicle 1001 of the switching. The notification to the driver is performed, for example, by vibration of the steering wheel, display of characters or patterns on a display device in the vehicle interior such as an instrument panel or a navigation screen, or an output of voice. When the driver performs a response operation to the notification, for example, gripping the steering wheel, pressing a driving mode switching button, or the like, and the switching of the driving mode is approved, the driving mode of the vehicle 1001 is switched from the automatic driving mode to the manual driving mode. After a lapse of the predetermined time from the switching, the vehicle control unit 1003 is configured to transmit the stop signal to the lamp control unit 1004.

The vehicle control unit 1003 determines whether or not the signboard 1203 can be detected from the vehicle 1001 based on the external information on the vehicle 1001 acquired by the sensor 1005, the camera 1006, the radar 1007, or the like. In a case where it is determined that the signboard 1203 cannot be detected from the vehicle 1001, that is, in a case where it is determined that the vehicle 1001 has moved to a position at which the signboard 1203 cannot be detected, the vehicle control unit 1003 is configured to transmit the stop signal to the lamp control unit 1004.

However, the timing at which the vehicle control unit 1003 starts transmission of the stop signal may be, for example, when the vehicle 1001 has traveled a predetermined distance from a position at which the signboard 1203 is first detected or when the predetermined time has elapsed from when the signboard 1203 is first detected, or the like.

Effects

As described above, when a situation different from the normal situation is encountered, the vehicle control unit 1003 switches from the automatic driving mode to the manual driving mode. At this time, although the driver suddenly drives himself/herself, it is difficult for the driver to immediately judge what to pay attention to, or what the attention needs to be taken. However, according to the vehicle lamp system 1020 according to the present embodiment, when the driving mode of the vehicle 1001 is switched from the automatic driving mode to the manual driving mode, the road surface drawing lamp 1102 illuminates the switching object that causes the switching of the driving mode. For example, then arrow 1030 is drawn on the road surface to point to the signboard 1203 indicating that the road is under construction. At this time, since the driver pays attention to an object pointed naturally, the driver can easily grasp what to pay attention to when driving. In addition, by emitting the light so as to extend to the switching object as in the present embodiment, the driver can easily move a line of sight along a beam of the light, and can more easily grasp the switching object.

Although an example in which a single object is used has been described in the embodiment described above, the present invention may include a plurality of objects.

Figure 18:
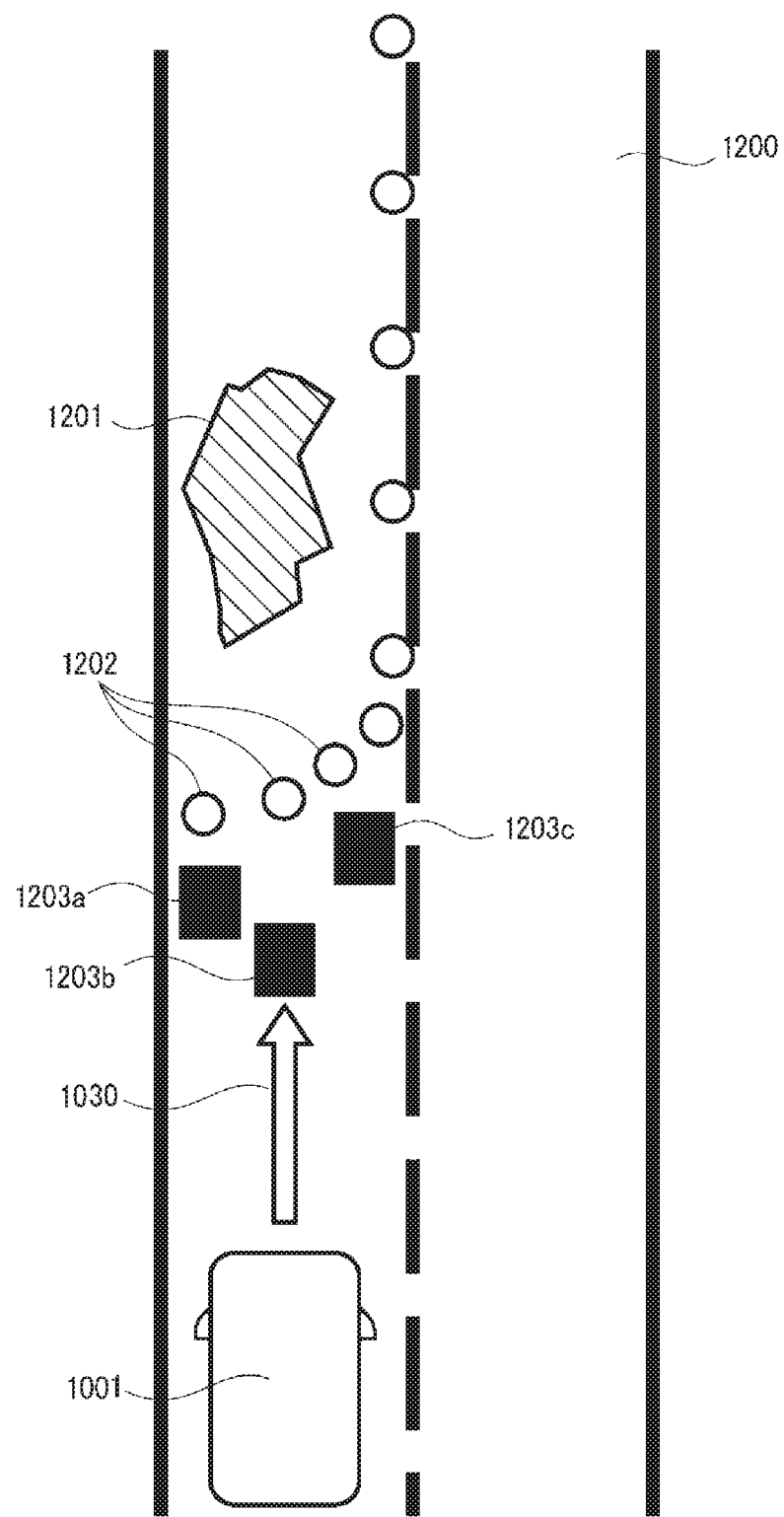
FIG. 18 is a diagram showing an example of the road surface drawing drawn by the road surface drawing lamp.

For example, as shown in FIG. 18, in a case where the vehicle control unit 1003 detects a plurality of objects 1203a, 1203b, and 1203c that cause the vehicle control unit 1003 to switch from the automatic driving mode to the manual driving mode, the lamp control unit 1004 may be configured to emit light so as to point to the object 1203b closest to the vehicle 1001 among the plurality of objects 1203a, 1203b, and 1203c. In the shown example, the arrow 1030 pointing to the object 1203b closest to the host vehicle 1001 is drawn. The driver is more likely to grasp the object 1203b closest to the vehicle 1001 among the plurality of objects 1203a, 1203b, and 1203c.

Figure 19:
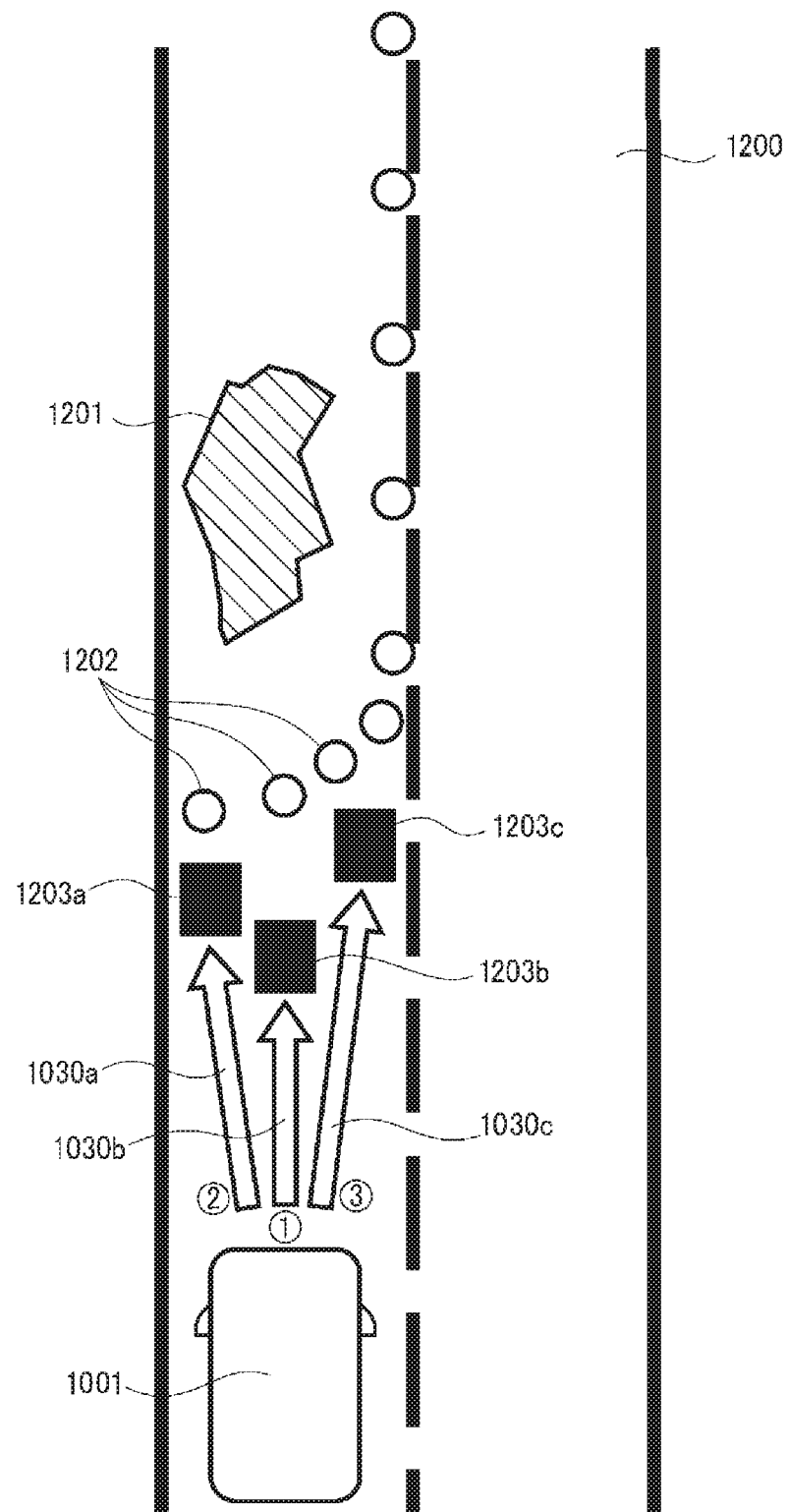
FIG. 19 is a diagram showing an example of the road surface drawing drawn by the road surface drawing lamp.

Alternatively, as shown in FIG. 19, in a case where the vehicle control unit 1003 detects the plurality of objects 1203a, 1203b, and 1203c that cause the vehicle control unit 1003 to switch from the automatic driving mode to the manual driving mode, the lamp control unit 1004 may be configured to emit light so as to point to the plurality of objects 1203a, 1203b, and 1203c in an ascending order of a distance from the vehicle 1001 to the plurality of objects 1203a, 1203b, and 1203c. In the shown example, after an arrow 1030b is drawn to point to the object 1203b, the arrow 1030b is erased and an arrow 1030a is drawn to point to the object 1203a, and then the arrow 1030a is erased and an arrow 1030c is drawn to point to the object 1203c. Alternatively, the drawing may be performed such that the arrows are sequentially added without erasing the arrows. As a result, this allows the driver to easily grasp the current entire situation including the plurality of objects 1203a, 1203b, and 1203c. In addition, since the plurality of objects are pointed in the ascending order of the distance, it is easy to understand a priority to be grasped.

Alternatively, in a case where the plurality of objects that cause the vehicle control unit 1003 to switch from the automatic driving mode to the manual driving mode are detected, the lamp control unit 1004 may be configured to emit light so as to simultaneously point to the plurality of objects. The driver is more likely to grasp the current entire situation including the plurality of objects.

The lamp control unit 1004 may be configured to draw arrows having different lengths and thicknesses according to distances between the plurality of objects and the vehicle 1001 and relative speeds of the plurality of objects and the host vehicle. Alternatively, the lamp control unit 1004 may be configured to draw different shapes such as an arrow, a star, a circle, a triangle, and a square depending on the distances between the plurality of objects and the vehicle 1001 and the relative speeds of the plurality of objects and the host vehicle.

In the present embodiment, the signboard 1203 is exemplified as the switching object pointed to by the arrow 1030, but the present invention is not limited thereto. For example, the switching object may be a depression of the road surface itself, a fallen tree on the road surface, a fallen object, water submergence on the road surface, a suddenly sick person who is falling on the road surface, an injured person, a worker who performs traffic control at the time of a power outage, or the like. Further, the switching object may be, for example, a fire truck, an ambulance, a snow removing vehicle, a cleaning vehicle, an oncoming vehicle traveling on a bottleneck where no two-way traffic is possible, a side road provided at the exit of the highway, or the like.

A form of pointing to the switching object is not limited to the arrow 1030 directed to the switching object. For example, the switching object itself may be illuminated in a spot manner or may be illuminated so as to surround the switching object with a circle. Further, the light may be irradiated in a different form according to a type of the switching object. For example, in a case where the switching object is a person, feet of the person may be surrounded by a circle so that no light is applied to a head, and in a case where the switching target is an fallen tree or the like, a long area is illuminated with light so as to point to the entire fallen tree.

The lamp used to point to the signboard 1203 is not limited to the road surface drawing lamp 1102 described above. For example, a road surface drawing lamp having a configuration different from the above-described configuration may be used. Alternatively, light may be emitted by the headlamp 1101 generally mounted on the vehicle 1001 so as to point to the switching object. Alternatively, a lamp different from the headlamp or the road surface drawing lamp may be used.

Third Embodiment

Next, a vehicle lamp system according to a third embodiment will be described.

In the vehicle capable of executing both the manual driving mode and the automatic driving mode, a vehicle control unit may switch to the manual driving mode due to some reason during the execution of the automatic driving mode. At this time, the user of the vehicle that is to be manually driven may be confused about the traveling direction of the vehicle when starting the manual driving.

Therefore, the present embodiment provides a vehicle lamp system 2020 in which the user is less likely to confuse the traveling direction of the vehicle when switching from the automatic driving to the manual driving. Similarly, the vehicle lamp system 2020 of the present embodiment is also mounted on the vehicle shown in FIGS. 11A and 11B used in the description of the second embodiment. In addition, a block diagram of the vehicle lamp system 2020 and the vehicle system of the third embodiment is the same as that of the second embodiment. Members of the third embodiment are denoted by reference numerals obtained by adding 1000 to the reference numerals of the corresponding members of the second embodiment, and a repetitive description thereof will be omitted.

Figure 20:
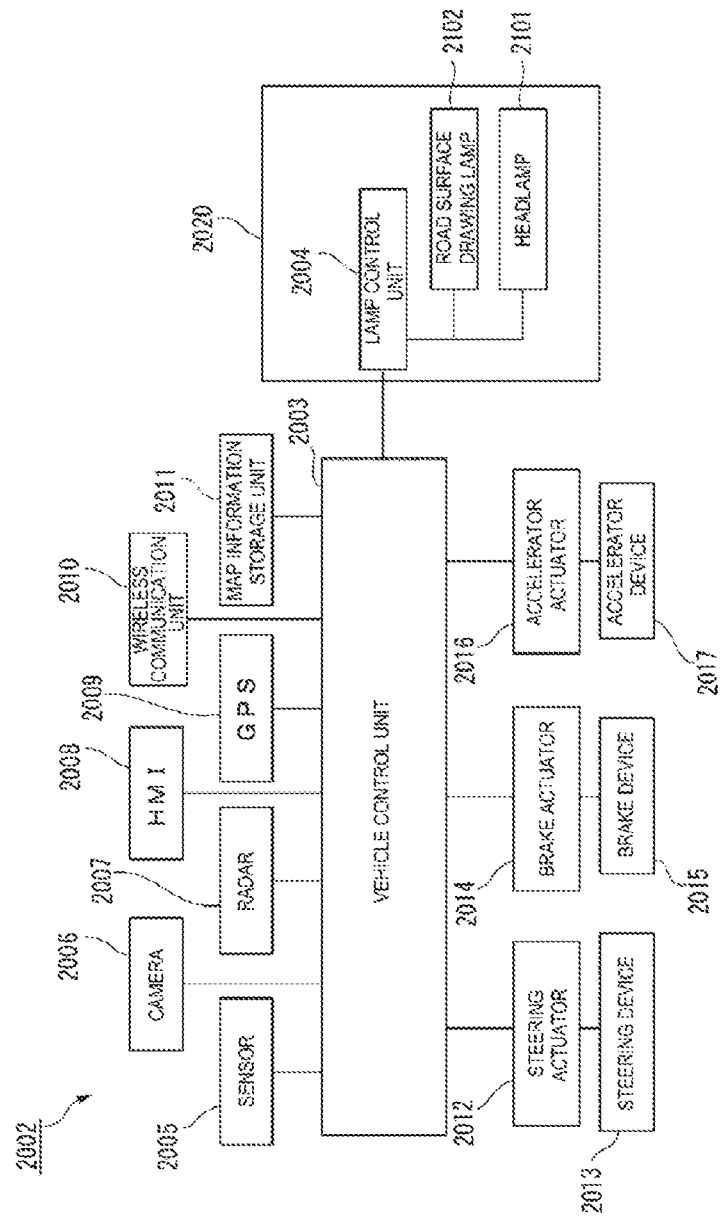
FIG. 20 is a block diagram of a vehicle system and the vehicle lamp system.

The vehicle lamp system 2020 of a vehicle 2001 will be described with reference to FIG. 20. As shown in FIG. 20, the vehicle lamp system 2020 includes a headlamp 2101, a road surface drawing lamp 2102, and a lamp control unit 2004 that controls these lamps.

The lamp control unit 2004 is connected to a vehicle control unit 2003, and is configured to control operations of the headlamp 2101 and the road surface drawing lamp 2102 based on a signal transmitted from the vehicle control unit 2003. For example, the lamp control unit 2004 can control the headlamp 2101 based on the signal transmitted from the vehicle control unit 2003 to emit light in a predetermined light distribution pattern. In addition, the lamp control unit 2004 can control the road surface drawing lamp 2102 based on the signal transmitted from the vehicle control unit 2003 to display a recommended route of the vehicle 2001.

The vehicle lamp system 2020 of the present embodiment is configured as a system independent from the vehicle system 2002, but is not limited to this configuration. For example, the vehicle lamp system may be configured as a system including the vehicle control unit 2003 and may be used together with the vehicle control unit 2003. Alternatively, the vehicle lamp system may be configured as a system including, for example, a camera, a sensor, a radar, or the like connected to the vehicle system 2002, and may be used together with the vehicle control unit 2003. In addition, the lamp control unit 2004 of the present embodiment is provided as an independent control unit different from the vehicle control unit 2003, but may be provided as a part of an ECU configuring the vehicle control unit 2003, for example.

Figure 21:
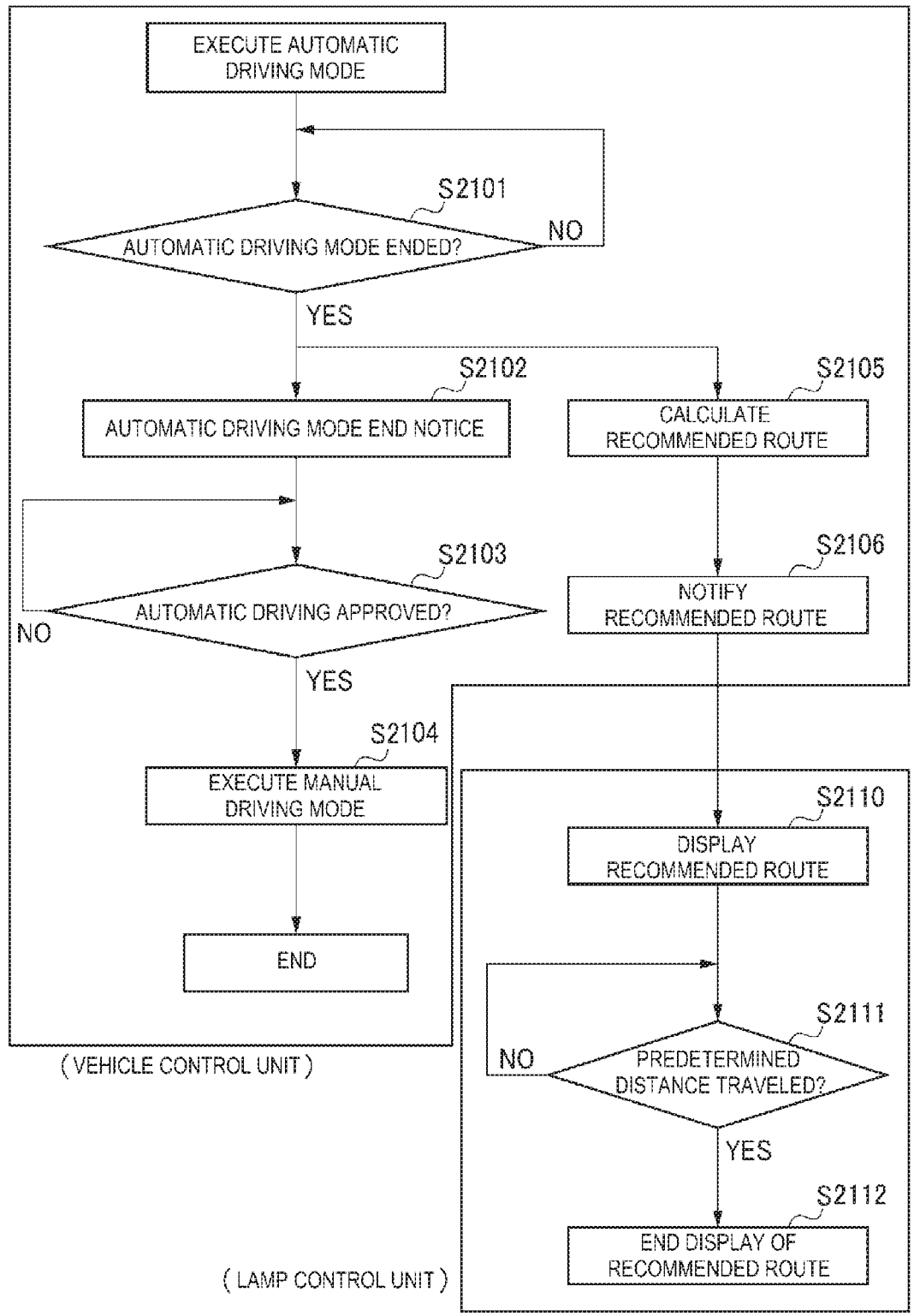
FIG. 21 is a flow chart executed by a lamp control unit of the vehicle lamp system.

Next, an operation example of the vehicle lamp system 2020 will be described with reference to FIGS. 21 and 22. FIG. 21 is a flow chart executed by the lamp control unit 2004 of the road surface drawing lamp 2102. In addition, FIG. 22 shows an example of the road surface drawing drawn by the road surface drawing lamp 2102.

Figure 22:
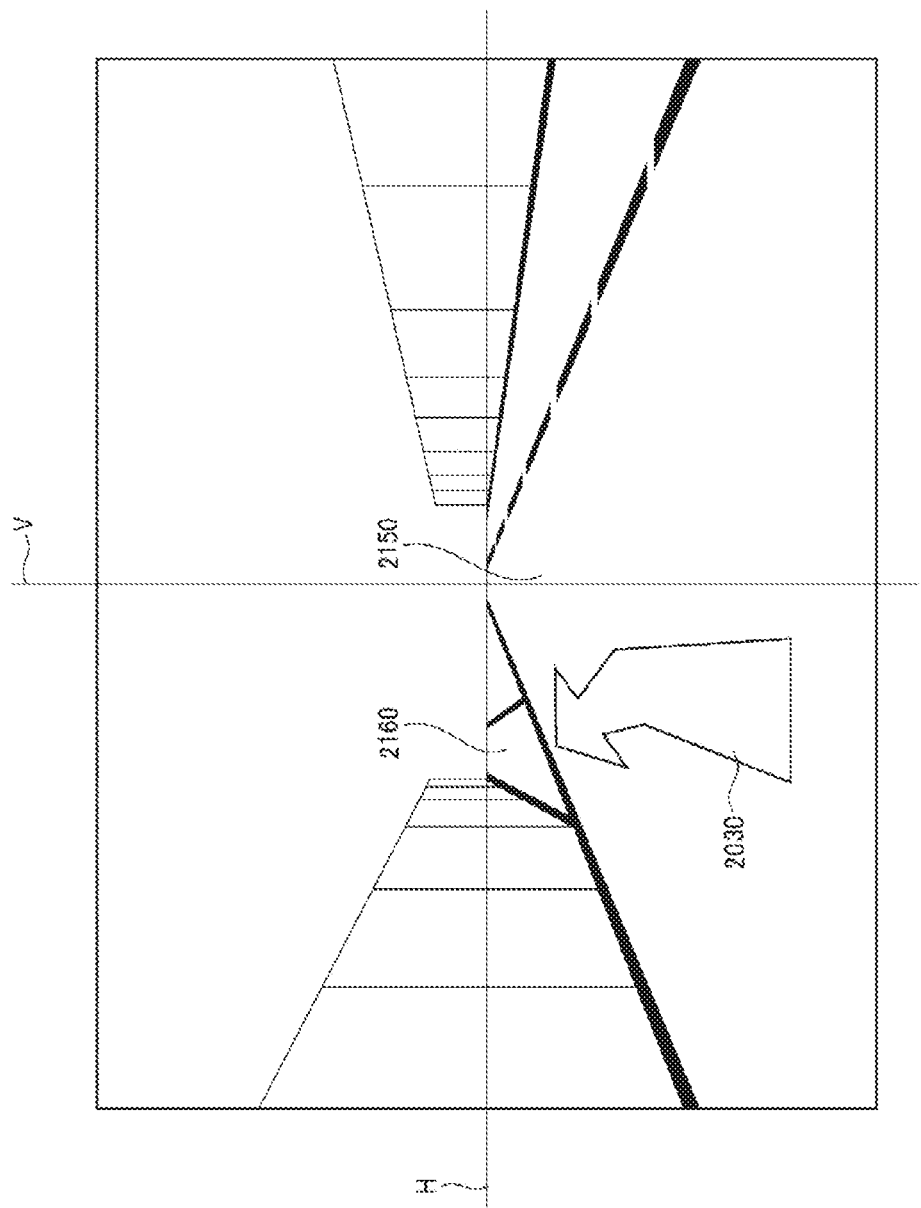
FIG. 22 is a diagram showing an example of the road surface drawing drawn by the road surface drawing lamp.

FIG. 22 is a front view seen from the driver's seat of the vehicle 2001, and shows a situation in which the vehicle 2001 traveling on a highway 2150 in the automatic driving mode approaches a target exit. A side road 2160 for getting off the highway 2150 appears in front of a left side of a traveling lane. Incidentally, the H line indicates a horizontal direction of the vehicle 2001, and the V line indicates a vertical direction of the vehicle 2001.

In FIG. 21, the vehicle control unit 2003 of the vehicle 2001 determines whether or not (whether or not the automatic driving mode is to be ended) the driving mode is switched from the automatic driving mode to the manual driving mode (step S2101), based on external information on the vehicle 2001 acquired by a sensor 2005, a camera 2006, a radar 2007, a GPS 2009, or the like.

In this example, the highway is a road on which the vehicle can travel in the automatic driving mode, but is a road on which the vehicle cannot travel in the automated driving mode from the side road 2160. The vehicle control unit 2003 determines whether or not it is necessary to switch from the automatic driving mode to the manual driving mode when the vehicle 2001 reaches a point (a target point) before a predetermined distance from the side road 2160 of the highway exit. As described above, the one (the side road 2160 in the present embodiment) specified as a cause by which the vehicle control unit 2003 switches the driving mode of the vehicle 2001 from the automatic driving mode to the manual driving mode is referred to as a "switching object".

The automatic driving mode here is the concept including the fully automatic driving mode and the advanced driving assistance mode. The manual driving mode is the concept including the driving assistance mode and the fully manual driving mode. The automatic driving mode and the manual driving mode here are distinguished by whether or not the driver has a sovereignty of driving the vehicle. In the fully automatic driving mode and the advanced driving assistance mode, the driver does not drive the vehicle. In the driving assistance mode and the fully manual driving mode, the driver drives the vehicle, and the vehicle control unit 2003 assists the driving by the driver.

For example, the vehicle control unit 2003 can determine whether or not the target point has been reached based on the GPS signal. Alternatively, the vehicle control unit 2003 can determine whether or not the target point has been reached based on the information acquired by the camera 2006 or the radar 2007. Further, the vehicle control unit 2003 can determine that the target point has been reached when the signal from a transmitter provided near an entrance of the side road 2160 is received at a predetermined intensity or higher.

In a case where it is determined that the automatic driving mode is not to be ended (step S2101: No), the vehicle control unit 2003 repeats a process of step S2101 while maintaining the automatic driving mode until it is determined that the automatic driving mode is to be ended.

In contrast, in a case where it is determined that the automatic driving mode is to be ended (step S2101: Yes), the vehicle control unit 2003 notifies the driver of the vehicle 2001 that the automatic driving mode is to be ended (end notice: step S2102). The notification to the driver is performed by, for example, vibrating the steering wheel, turning on light in the vehicle, or the like. In addition, it may be notified by voice such as "please drive manually since automatic driving mode is ended".

The vehicle control unit 2003 determines whether or not the driver who has received the notification of the end notice has approved end of the automatic driving mode (whether or not the switching to the manual driving mode has been approved). Whether or not it has been approved is determined based on whether or not the driver has made a predetermined response to the end notice (step S2103). For example, the determination is made based on whether the driver has gripped the steering wheel for manual driving, whether or not the driver has performed a switching operation of the driving mode switch, or the like.

In a case where it is determined that the predetermined response has not been made to the end notice (step S2103: No), the vehicle control unit 2003 repeats a determination process of step S2103.

In contrast, in a case where it is determined that the predetermined response has been made to the end notice (step S2103: Yes), the vehicle control unit 2003 switches the driving mode to the manual driving mode (step S2104).

In the case where it is determined in step S2101 that the automatic driving mode is to be ended (step S2101: Yes), the vehicle control unit 2003 calculates the recommended route of the vehicle 2001 to be traveled when the driving mode is switched to the manual driving mode based on the external information on the vehicle 2001 (recommended route calculation: step S2105). In this example, a route toward the side road 2160 is the recommended route. The vehicle control unit 2003 transmits calculated recommended route data to the lamp control unit 2004 (recommended route notification: step S2106).

The lamp control unit 2004 that has receives the recommended route data from the vehicle control unit 2003, the lamp control unit 2004 controls the road surface drawing lamp 2102 to draw the recommended route proposed by the vehicle control unit 2003 on the road surface (step S2110). The recommended route is drawn in an area in front of the vehicle traveling when the driving mode is switched to the manual driving mode (a scheduled area to be traveled). For example, the recommended route is drawn as an arrow 2030 that extends from the traveling lane of the vehicle 2001 toward an exit of the side road 2160 (see FIG. 22). Incidentally, the drawing form is not limited to the arrow. In addition, the recommended route is drawn at a time point before a time point when the driving mode is actually switched from the automatic driving mode to the manual driving mode. For example, the recommended route is preferably drawn substantially at the same time as the end notice of step S2102.

The recommended route data transmitted from the vehicle control unit 2003 to the lamp control unit 2004 is updated according to a change in a position or a speed at which the vehicle 2001 is traveling. Therefore, a control of the road surface drawing lamp 2102 by the lamp control unit 2004 is also sequentially updated, and a form of the arrow 2030 (for example, a length and a direction of the arrow, or the like) drawn on the road surface by the road surface drawing lamp 2102 changes every moment.

The vehicle control unit 2003 determines whether or not the vehicle 2001 has traveled a predetermined distance after the recommended route is drawn on the road surface based on the external information on the vehicle 2001 acquired by the sensor 2005, the camera 2006, the radar 2007, the GPS 2009, or the like. In a case where it is determined that the vehicle has traveled the predetermined distance, the vehicle control unit 2003 transmits a "traveling signal" indicating that the traveling of the vehicle to the lamp control unit 2004. In the present embodiment, the predetermined distance means a distance that the vehicle 2001 would have already entered and traveled to the side road 2160 from the highway 2150 if the vehicle 2001 is traveling with the driving mode switched to the manual driving mode.

The lamp control unit 2004 determines whether or not the traveling signal has been transmitted from the vehicle control unit 2003 (step S2111).

In a case where it is determined that the traveling signal has not been transmitted (step S2111: No), that is, in a case where it is determined that the vehicle 2001 has not traveled the predetermined distance, the lamp control unit 2004 repeats a process of step S2111 until the traveling signal is transmitted.

In contrast, in a case where it is determined that the traveling signal has been transmitted (step S2111: Yes), that is, in a case where it is determined that the vehicle 2001 has traveled the predetermined distance, the lamp control unit 2004 controls the road surface drawing lamp 2102 to end the drawing of the recommended route (step S2112).

The determination of whether or not to end the display of the recommended route, that is, the determination in step S2111 may be performed based on, for example, whether or not a predetermined time has elapsed since the recommended route is drawn on the road surface. Alternatively, the determination may be performed based on whether or not the vehicle 2001 has traveled the predetermined distance after the driver has approved the switching to the manual driving mode, or may be performed based on whether or not the predetermined time has elapsed since the driver has approved the switching to the manual driving mode.

Effects

When the driving mode is switched from the automatic driving mode to the manual driving mode, the user may suddenly feel as if he/she is forced to drive. For example, during the execution of the fully automatic driving mode, the user may not be able to drive, and thus may be resting. At this time, the vehicle 2001 may enter an area where the vehicle cannot travel in the automatic driving mode. Then, the user who is in rest is suddenly forced to perform the manual driving, and it may be difficult to select a driving operation to be performed at the next moment.

However, according to the vehicle lamp system 2020 of the present embodiment, before the driving mode is switched from the automatic driving mode to the manual driving mode, the recommended route on which the vehicle 2001 is to travel in the manual driving mode is drawn by the road surface drawing lamp 2102. Therefore, the driver who has started the manual driving only needs to advance the vehicle 2001 along the recommended route drawn by the road surface drawing lamp 2102, and the driver can make the vehicle 2001 to travel without hesitation.

Figure 23:
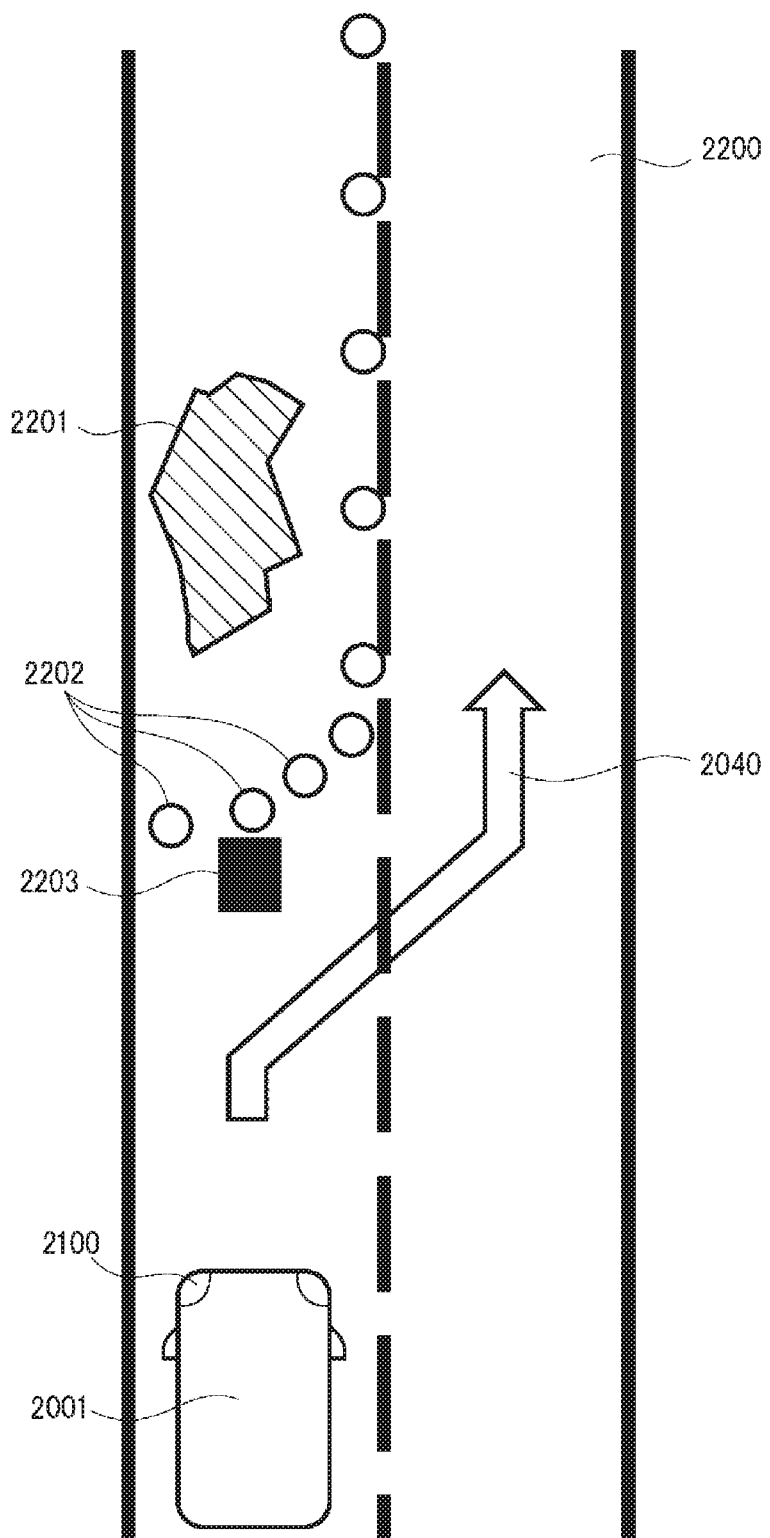
FIG. 23 is a diagram showing another example of the road surface drawing drawn by the road surface drawing lamp.

In the embodiment described above, an example has been described in which the automatic driving mode is switched from the automatic driving mode to the manual driving mode when entering the side road 2160 from the highway, but the present invention is not limited to this example. Next, the operation example of the vehicle lamp system 2020 will be described with reference to FIGS. 21 and 23. FIG. 23 shows another example of the road surface drawing drawn by the road surface drawing lamp 2102. Incidentally, the description of the same operations as the above operation example described with reference to FIG. 22 will be appropriately omitted.

FIG. 23 shows a situation in which a depression 2201 is formed on a road 2200, a lane is regulated and color cones 2202 (registered trademark) are lined up in order to perform construction of the depression 2201, and for example, a signboard 2203 indicating that the road is under construction is installed. Further, a situation in which the vehicle 2001 traveling on the road 2200 in the automatic driving mode approaches a place during construction is shown.

The vehicle control unit 2003 of the vehicle 2001 determines whether to the driving mode is switched from the automatic driving mode to the manual driving mode based on the external information (whether to the automatic driving mode is to be ended) (step S2101). In this example, it is determined whether or not the signboard 2203 that is the switching object installed on the road is detected.

In the case where it is determined that the automatic driving mode is to be ended, the vehicle control unit 2003 notifies the driver of the end notice (step S2102), and after receiving the response from the driver (step S2103), the driving mode of the vehicle 2001 is switched to the manual driving mode (step S2104). In addition, the vehicle control unit 2003 calculates the recommended route of the vehicle 2001 (step S2105), and notifies the lamp control unit 2004 of the calculated recommended route data (step S2106).

The lamp control unit 2004 controls the road surface drawing lamp 2102 to draw the recommended route proposed by the vehicle control unit 2003 on the road surface (step S2110). The recommended route is drawn, for example, as an arrow 2040 (avoidance course) guides the vehicle to avoid the signboard 2203 and the color cones 2202 and make a detour to an oncoming lane (see FIG. 23).

The lamp control unit 2004 determines whether or not the traveling signal has been transmitted from the vehicle control unit 2003 as in the operation example described above (step S2111). Incidentally, in this operation example, the predetermined distance determined to transmit the traveling signal by the vehicle control unit 2003 means the distance traveled by the vehicle 2001 in order to pass through a construction section (see FIG. 23). In the case where it is determined that the vehicle has traveled the predetermined distance, the lamp control unit 2004 ends the drawing of the recommended route (step S2112).

Even in such a case, the present invention is applied, and the vehicle 2001 can be caused to travel without hesitation of the user who has switched from the automatic driving mode to the manual driving mode.

Figure 24:
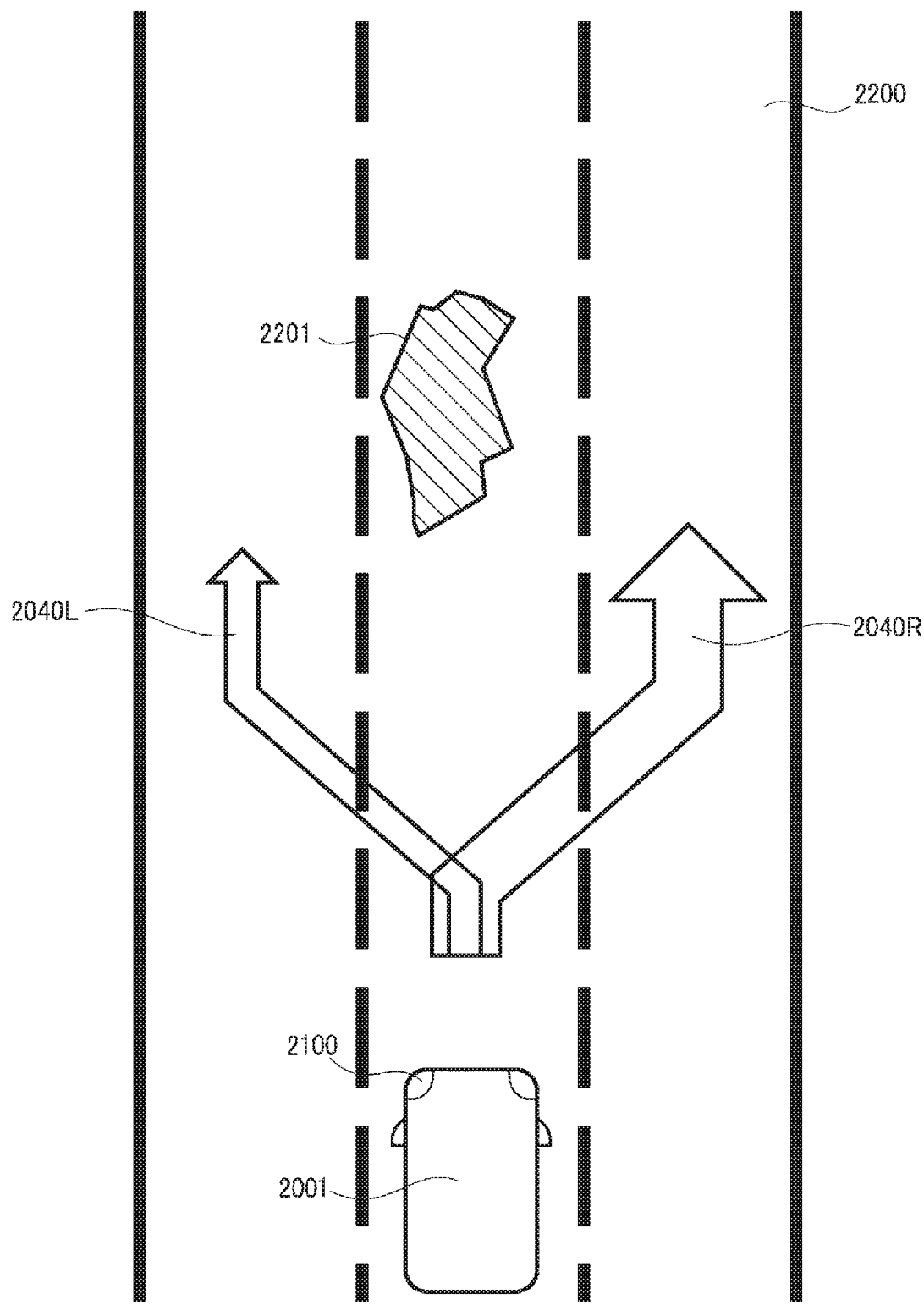
FIG. 24 shows a state in which a plurality of recommended routes are drawn by the road surface drawing lamp.

There may be a plurality of recommended routes. In this case, the lamp control unit 2004 may be configured such that the plurality of recommended routes are illuminated. FIG. 24 shows a state in which a plurality of recommended routes are illuminated.

As shown in FIG. 24, in a case where there is a road surface the depression 2201 on a road surface in the middle lane of three lanes, there is a right detour passing through a right side of the depression 2201 and a left detour passing through a left side of the depression 2201. Therefore, the lamp control unit 2004 controls the road surface drawing lamp 2102 to illuminate an arrow 2040R indicating the right detour as the recommended route and an arrow 2040L indicating the left detour as the recommended route. In the shown situation, the vehicle control unit 2003 sets the right detour as a first recommended route and the left detour as a second recommended route based on navigation information that the vehicle turns right at a preceding intersection. Therefore, the arrow 2040R is drawn thicker than the arrow 2040L, which indicates the recommended route indicated by the arrow 2040R has a higher degree of recommendation than the recommended route indicated by the arrow 2040L.

Unlike the shown example, a number "1" may be drawn in the arrow 2040R and a number "2" may be drawn in the arrow 2040L in order to indicate the degree of recommendation. Alternatively, the arrow 2040R may be drawn brighter than the arrow 2040L in order to indicate the degree of recommendation. In addition, in order to indicate the degree of recommendation, a shape, brightness, color, a blinking cycle, or the like of the display indicating the recommended route may be made different.

All recommended routes may be drawn in the same manner without indicating the degree of recommendation.

Although the embodiments of the present invention have been described above, it goes without saying that the technical scope of the present invention should not be interpreted as being limited by the description of the present embodiments. It is to be understood by those skilled in the art that the present embodiment is merely an example, and various modifications can be made within the scope of the invention described in the claims. The technical scope of the present invention should be determined based on the scope of the invention described in the claims and an equivalent scope thereof.

In the above description, the side road 2160 and the signboard 2203 are exemplified as the switching objects when the recommended route is drawn, but the present invention is not limited thereto. For example, the switching object may be an fallen tree on the road surface, a fallen object, a water submergence on the road surface, a fire truck, an ambulance, a snow removing vehicle, a cleaning vehicle, an oncoming vehicle traveling on a bottleneck where no two-way traffic is possible, or the like. In a case where the switching object is a fire truck or an ambulance, a recommended route is displayed so as to evacuate the vehicle and cause the fire truck or the ambulance travel first. In a case where the switching object is a snow removing vehicle, a recommended route is displayed so as to follow the snow removing vehicle. In addition, in a case where the switching object is an oncoming vehicle traveling on a bottleneck, a recommended route for instructing the host vehicle to wait or a recommended route to which the host vehicle should move first is displayed.

In the above description, it is assumed that the lamp control unit 2004 is mounted on a lamp unit 2100, and the vehicle lamp system 2020 is configured as an independent system different from the vehicle system 2002. However, the present invention is not limited to this configuration. For example, the vehicle lamp system may be configured as a system including the vehicle control unit 2003. Alternatively, the vehicle lamp system may be configured as a system including, for example, a camera, a sensor, a radar, or the like connected to the vehicle system 2002. In addition, the lamp control unit 2004 may be configured as a part of the ECU configuring the vehicle control unit 2003. In this case, the lamp control unit 2004 is mounted on the vehicle 2001 instead of the lamp unit 2100.

In the present embodiment, the driving mode of the vehicle has been described as including the fully automatic driving mode, the advanced driving assistance mode, the driving assistance mode, and the fully manual driving mode, but the driving mode of the vehicle should not be limited to these four modes.

A classification and a display form of the driving mode of the vehicle may be appropriately changed according to laws or regulations related to the automatic driving in each country. Similarly, the definitions of the "fully automatic driving mode", the "advanced driving assistance mode", and the "driving assistance mode" described in the description of the present embodiment are merely examples, and these definitions may be appropriately changed according to laws or regulations related to the automatic driving in each country.

The present application is based on a Japanese Patent Application No. 2017-207465 filed on Oct. 26, 2017, a Japanese Patent Application No. 2017-207466 filed on Oct. 26, 2017, and a Japanese Patent Application No. 2017-

207467 filed on Oct. 26, 2017, the contents of which are incorporated herein by reference.

INDUSTRIAL APPLICABILITY

According to an aspect of the present invention, there is provided the vehicle headlamp system and the vehicle lamp system in which the user can easily grasp the surrounding situation when switching from the automatic driving to the manual driving.

The invention claimed is:

1. A vehicle headlamp system that is used with a vehicle control unit configured to switch from an automatic driving mode to a manual driving mode based on external information of a vehicle, the vehicle headlamp system comprising:
    a headlamp mounted on the vehicle; and
    a lamp control unit configured to control the headlamp,
    wherein the lamp control unit is configured to
        control the headlamp to form a first light distribution pattern while the vehicle control unit is executing the automatic driving mode,
        control the headlamp to form a second light distribution pattern while the vehicle control unit is executing the manual driving mode, and
        control the headlamp to form a third light distribution pattern that illuminates at an illuminance equal to or higher than an illuminance of the first light distribution pattern and/or illuminates an area equal to or larger than an illumination area of the first light distribution pattern when transitioning from the automatic driving mode to the manual driving mode.

2. The vehicle headlamp system according to claim 1, wherein the lamp control unit controls the headlamp to form the third light distribution pattern when a notice signal for switching from the automatic driving mode to the manual driving mode is input from the vehicle control unit.

3. The vehicle headlamp system according to claim 1, wherein the lamp control unit controls the headlamp to form the third light distribution pattern when a switching signal for switching from the automatic driving mode to the manual driving mode is input from the vehicle control unit.

4. The vehicle headlamp system according to claim 1, wherein the third light distribution pattern is brighter than an illuminance of the second light distribution pattern and/or is illuminated in an area equal to or larger than an illumination area of the second light distribution pattern.

5. A vehicle lamp system that is used with a vehicle control unit configured to switch from an automatic driving mode to a manual driving mode based on external information of a vehicle, the vehicle lamp system comprising:
    a lamp mounted on the vehicle; and
    a lamp control unit configured to control the lamp,
    wherein the lamp control unit emits light so as to point to an object, among a plurality of objects, that causes the vehicle control unit to switch from the automatic driving mode to the manual driving mode,
    wherein the lamp control unit emits light so as to sequentially point to the plurality of objects in an ascending order of a distance from the vehicle, and
    wherein the lamp control unit stops emitting light to the object when:
        the object is out of a detection range;
        the vehicle has traveled a predetermined distance from a position at which the object is first detected; or
        a predetermined time has elapsed since the object is first detected.

6. The vehicle lamp system according to claim 5, wherein the lamp control unit is configured to acquire a direction of the object as viewed from the vehicle from the vehicle control unit.

7. The vehicle lamp system according to claim 5, wherein the lamp control unit emits light so as to point to the object closest to the vehicle from among the plurality of objects.

8. A vehicle lamp system that is used with a vehicle control unit configured to switch from an automatic driving mode to a manual driving mode based on external information of a vehicle, the vehicle lamp system comprising:
    a lamp mounted on the vehicle; and
    a lamp control unit configured to control the lamp,
    wherein the lamp control unit illuminates a recommended route of the vehicle proposed by the vehicle control unit with the lamp before the vehicle control unit switches from the automatic driving mode to the manual driving mode, and
    wherein the lamp illuminates a plurality of recommended routes by displaying different appearance to indicate different degrees of recommendation.

9. The vehicle lamp system according to claim 8, wherein the recommended route is a route that the vehicle control unit recommends that the vehicle travels in a scheduled area to be traveled in the manual driving mode.

* * * * *